(12) United States Patent
Okawa et al.

(10) Patent No.: US 9,976,495 B2
(45) Date of Patent: May 22, 2018

(54) INTERNAL COMBUSTION ENGINE

(71) Applicant: TOYOTA JIDOSHA KABUSHIKI KAISHA, Toyota-shi, Aichi (JP)

(72) Inventors: Makoto Okawa, Toyota (JP); Kazuhito Sakai, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 118 days.

(21) Appl. No.: 15/124,793

(22) PCT Filed: Mar. 12, 2015

(86) PCT No.: PCT/JP2015/057330
§ 371 (c)(1),
(2) Date: Sep. 9, 2016

(87) PCT Pub. No.: WO2015/137456
PCT Pub. Date: Sep. 17, 2015

(65) Prior Publication Data
US 2017/0211488 A1 Jul. 27, 2017

(30) Foreign Application Priority Data

Mar. 13, 2014 (JP) ................................. 2014-050389

(51) Int. Cl.
| | | |
|---|---|---|
| *F02D 15/04* | (2006.01) | |
| *F16D 41/066* | (2006.01) | |
| *F16D 41/08* | (2006.01) | |
| *F02B 75/04* | (2006.01) | |
| *F16D 48/06* | (2006.01) | |

(52) U.S. Cl.
CPC ............ *F02D 15/04* (2013.01); *F02B 75/041* (2013.01); *F16D 41/066* (2013.01);
(Continued)

(58) Field of Classification Search
CPC ........ F02D 15/04; F02D 15/00; F02B 75/041; F02B 75/04; F16D 41/066; F16D 41/088;
(Continued)

(56) References Cited

U.S. PATENT DOCUMENTS 5,329,893 A * 7/1994 Drangel ................ F02B 75/041
123/195 C
6,260,532 B1 * 7/2001 Mendler ............... F02B 75/047
123/192.2
(Continued)

FOREIGN PATENT DOCUMENTS

JP 2005-214088 A 8/2005
JP 2012-229764 A 11/2012

*Primary Examiner* — Lindsay Low
*Assistant Examiner* — John Bailey
(74) *Attorney, Agent, or Firm* — Hunton Andrews Kurth LLP

(57) ABSTRACT

In the present invention, an internal combustion engine is provided with a variable-compression-ratio mechanism with a variable mechanical compression ratio and the variable-compression-ratio mechanism comprises a drive device for changing the volume of a combustion chamber when a piston reaches top dead center. The drive device comprises a reverse input blocking clutch disposed in a drive power transmission path for transmitting the rotational force of a rotator. A control device estimates the reverse input torque applied to an output shaft of the reverse input blocking clutch and sets a gradient for torque output by the rotator and a continuation duration for continuing the torque increase on the basis of the reverse input torque.

8 Claims, 17 Drawing Sheets

(52) U.S. Cl.
CPC ........... F16D 41/088 (2013.01); F16D 48/06 (2013.01); *F16D 2500/30822* (2013.01); *F16D 2500/50227* (2013.01); *F16D 2500/70458* (2013.01)

(58) Field of Classification Search
CPC ........... F16D 48/06; F16D 2500/30822; F16D 2500/50227; F16D 2500/70458
USPC .......... 123/193.2, 73 AC, 182.1, 193.4, 202, 123/204, 212, 223, 225, 226, 230, 197.5, 123/197.1, 197.4, 197.3; 92/69 R, 69 B, 92/75, 60.5; 192/85.17, 45.004, 192/45.017–45.02, 45.005, 47, 54.1, 192/69.41, 85.5, 85.53, 85.55, 85.63; 701/67, 68; 74/595, 600, 601; 477/89
See application file for complete search history.

(56) References Cited

U.S. PATENT DOCUMENTS

| | | | | |
|---|---|---|---|---|
| 2005/0061270 | A1* | 3/2005 | Yamada | F02B 75/045 123/78 E |
| 2005/0217618 | A1* | 10/2005 | Watanabe | F02B 75/047 123/78 F |
| 2008/0173281 | A1* | 7/2008 | Jurging | F02B 75/04 123/48 B |
| 2008/0190406 | A1* | 8/2008 | Akihisa | F02D 15/04 123/78 C |
| 2009/0101113 | A1* | 4/2009 | Kamiyama | F02B 75/041 123/48 C |
| 2010/0132674 | A1* | 6/2010 | Akihisa | F02B 75/041 123/48 C |
| 2014/0039771 | A1 | 2/2014 | Mori et al. | |

* cited by examiner

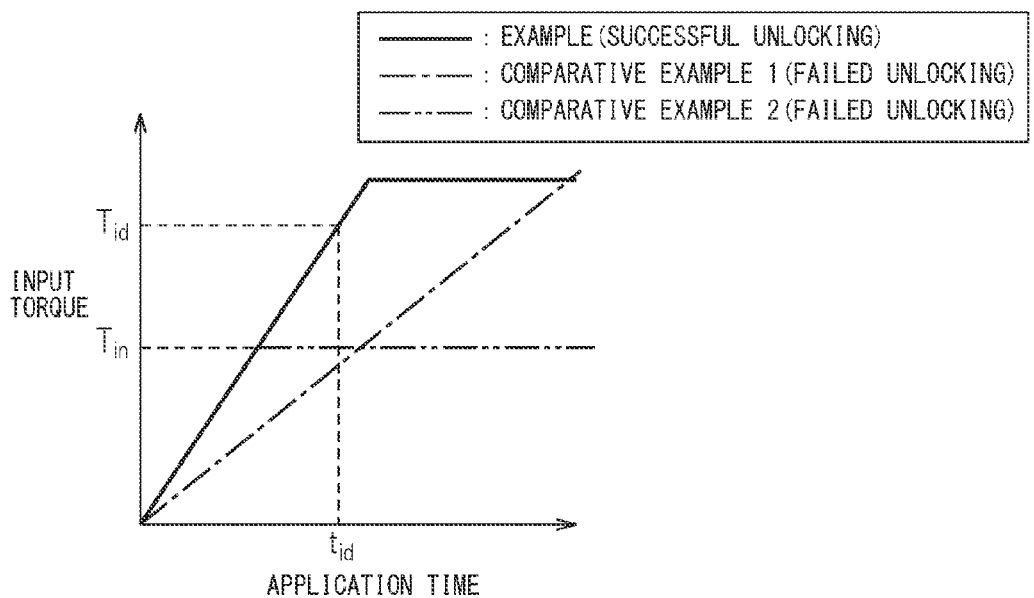
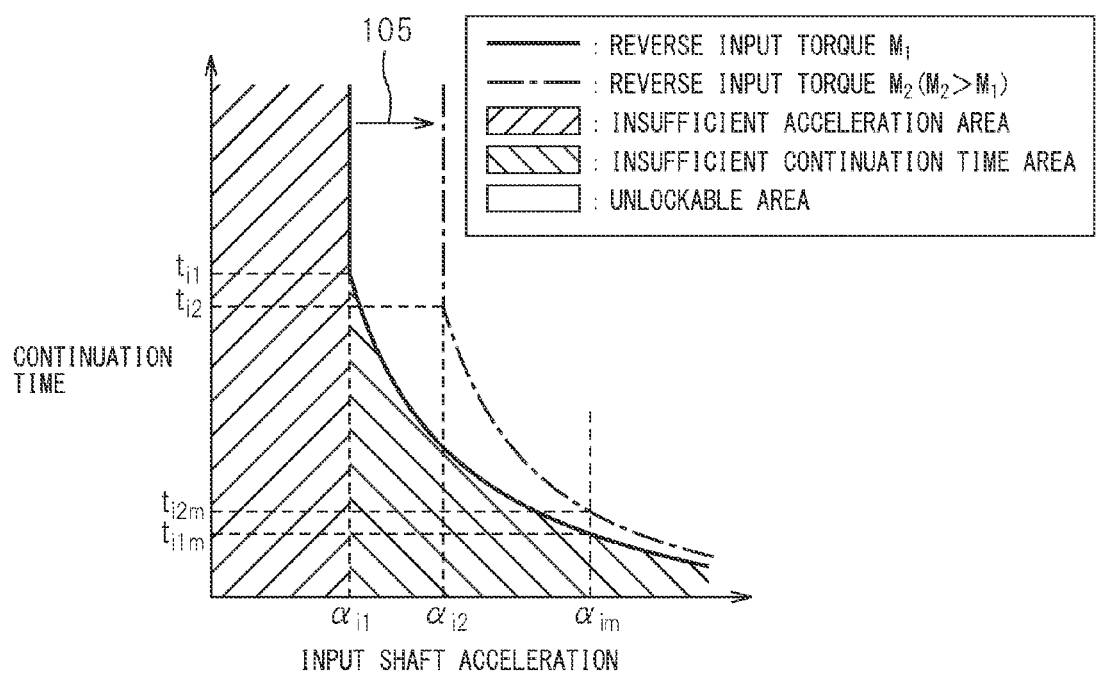

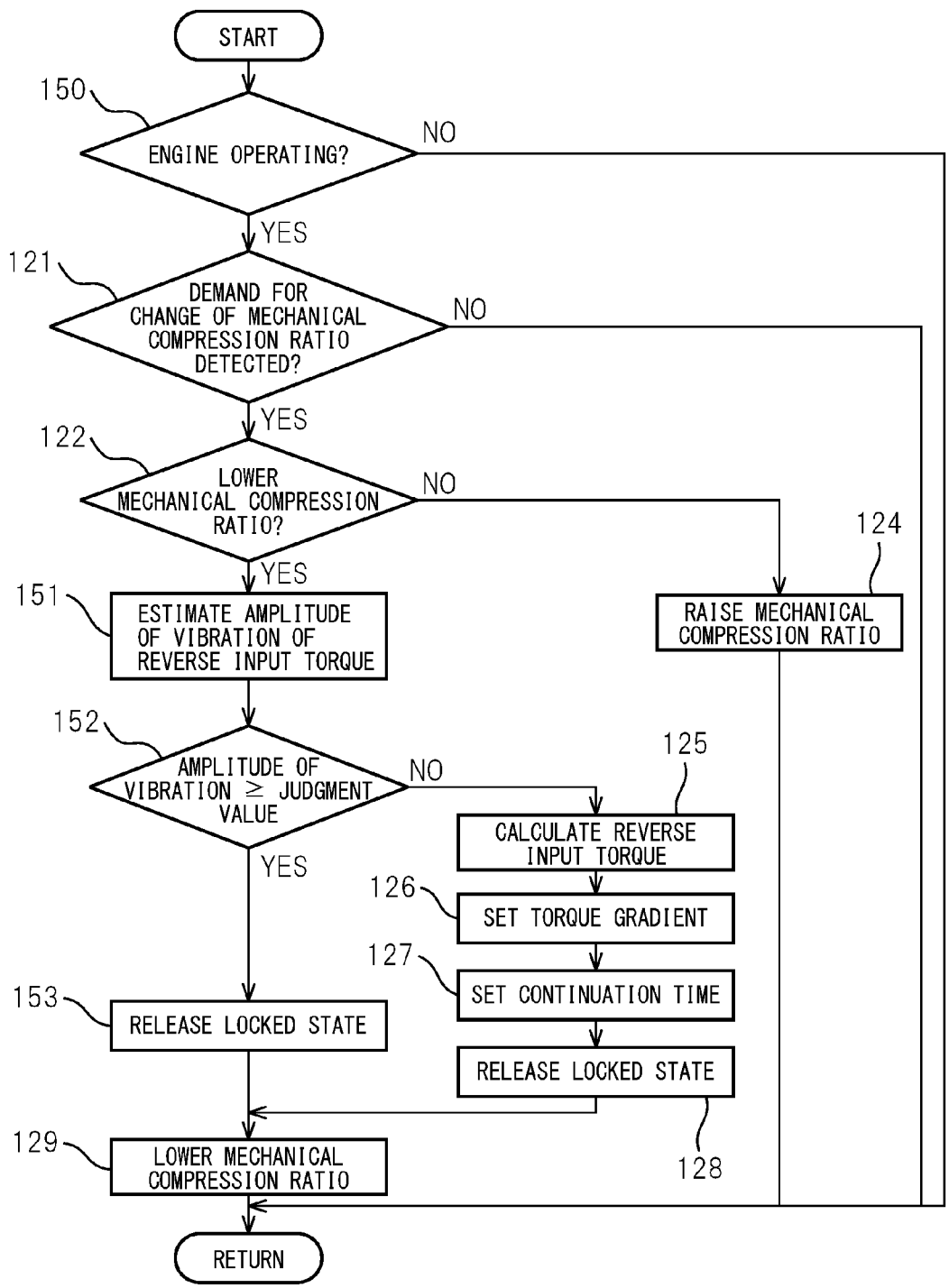

INTERNAL COMBUSTION ENGINE

CROSS-REFERENCE TO RELATED APPLICATIONS

This is a national phase application based on the PCT International Patent Application No. PCT/JP2015/057330 filed Mar. 12, 2015, claiming priority to Japanese Patent Application No. 2014-050389 filed Mar. 13, 2014, the entire contents of both of which are incorporated herein by reference.

TECHNICAL FIELD

The present invention relates to an internal combustion engine.

BACKGROUND ART

In a combustion chamber of an internal combustion engine, an air-fuel mixture of air and fuel is ignited in a compressed state. The compression ratio when compressing the air-fuel mixture is known to have an effect on the output and amount of fuel consumption of the internal combustion engine. It is possible to increase the compression ratio to thereby increase the output torque and improve the heat efficiency. In this regard, it is known that if making the compression ratio too high, knocking and other forms of abnormal combustion will occur. Known in the prior art has therefore been an internal combustion engine comprising a variable compression ratio mechanism changing the compression ratio during the operating period.

The variable compression ratio mechanism can change the volume of a combustion chamber at the time when a piston reaches top dead center to thereby change the compression ratio. If fuel is burned in a combustion chamber, the cylinder internal pressure rises. Further, force acts on members forming the combustion chamber in a direction increasing the combustion chamber in volume. This force also acts on the variable compression ratio mechanism. In particular, this force is liable to be transmitted to a motor or other rotating machine driving the mechanism changing the volume of the combustion chamber.

For this reason, in a variable compression ratio mechanism, it is known to arrange a reverse input blocking clutch blocking rotational force due to the cylinder internal pressure so that the rotational force due to the cylinder internal pressure is not transmitted to an output shaft of the rotating machine. A reverse input blocking clutch has a lock function blocking the rotational force applied to the output shaft of the rotating machine. When changing the mechanical compression ratio, the locked state of the reverse input blocking clutch is released, then the volume of the combustion chamber is changed.

Japanese Patent Publication No. 2005-214088A discloses a variable compression ratio engine able to make a reciprocating operating element advance and retract so as to change the position where the piston reaches top dead center. This variable compression ratio engine is changed in compression ratio by an actuator mechanism. The actuator mechanism comprises a ball screw, a rotation transmission system transmitting rotation of a motor to a nut of the ball screw, and a clutch interposed in the rotation transmission system. This publication discloses to employ a reverse input restricting type of clutch which transmits rotation from an input member to which drive force of the motor is input to a nut and blocks transmission of rotation from the nut to the input member.

Japanese Patent Publication No. 2012-229764 discloses an unlocking device comprising a torque diode blocking a load torque of an output shaft from being transmitted to an input shaft when a torque is transmitted from the input shaft to the output shaft and releasing a locked state of the torque diode. In this unlocking control device, it is disclosed to gradually increase the unlocking torque when the locked state is not released even after continuing to apply a set unlocking torque for a predetermined time.

SUMMARY OF INVENTION

Technical Problem

When changing the mechanical compression ratio, it is necessary to release the locked state of the reverse input blocking clutch. During operation of the engine, rotational force due to cylinder internal pressure is applied to the reverse input blocking clutch. The cylinder internal pressure changes along with time. The torque required for releasing the locked state of the reverse input blocking clutch therefore changes along with time.

The mechanical compression ratio may be changed not only in the period of driving the engine, but also in the period when the engine is stopped. For example, sometimes the mechanical compression ratio is changed right before starting up the engine so as to detect abnormality of the variable compression ratio mechanism. Further, in a hybrid drive system powered by an internal combustion engine and an electric motor, there is a period during which the engine is temporarily stopped. During this period, sometimes the mechanical compression ratio is changed so as to form an oil film on the surface of the eccentric shafts etc. and avoid seizure of the bearings.

In this way, to release the locked state of a reverse input blocking clutch in all states which occur during both periods when an engine is operating and when it is stopped, it may be considered to select a rotating machine with a large output torque as the rotating machine for driving the input shaft of the reverse input blocking clutch. However, if increasing the capacity of the rotating machine, there are the problems that the power consumption increases or the amount of consumption of fuel by the internal combustion engine increases. Further, there are the problems that the rotating machine becomes larger in size and the locations for installation of the rotating machine become limited.

The present invention has as its object the provision of an internal combustion engine comprising a variable compression ratio mechanism including a reverse input blocking clutch and able to reduce the size of the rotating machine driving the variable compression ratio mechanism.

An internal combustion engine of the present invention comprises a variable compression ratio mechanism able to change a mechanical compression ratio. The variable compression ratio mechanism includes a drive device for changing a volume of a combustion chamber when a piston reaches top dead center, and a control device controlling the drive device. The drive device includes a rotating machine, and a clutch arranged in a drive force transmission path transmitting the rotational force of the rotating machine. The clutch is formed so as to block a reverse input torque applied to an output shaft in a rotation direction causing the mechanical compression ratio to fall. The control device estimates a reverse input torque applied to the output shaft of the clutch, sets a torque gradient to be output by the rotating machine and a continuation time for continuation of increase of torque based on the reverse input torque, and releases a locked state of the clutch based on the torque gradient and the continuation time.

In the above invention, the clutch includes an input shaft to which a rotational force of the rotating machine is input, an output shaft to which the rotational force is transmitted from the input shaft, and an outer race not moving while the clutch is being driven, rollers are arranged between the output shaft and the outer race, the output shaft and the outer race form engagement parts for engaging with the rollers, and the clutch is formed so that when the reverse input torque in the rotation direction causing the mechanical compression ratio to fall acts on the output shaft, the rollers are engaged with the engagement parts and lock the output shaft with the outer race thereby blocking the reverse input torque. The control device makes the input shaft rotate based on the torque gradient and the continuation time to thereby separate the rollers from the engagement parts and release the lock on the output shaft.

In the above invention, the rotating machine includes an electric motor, and the control device changes a duty ratio of current supplied to the electric motor to thereby control the torque gradient and changes a time period for supplying power to the electric motor to thereby control the continuation time.

In the above invention, the variable compression ratio mechanism includes a lubrication oil supplying device supplying lubrication oil to the clutch and a temperature detector detecting a temperature of the lubrication oil, and the control device detects a temperature of the lubrication oil and controls the torque gradient and the continuation time based on the temperature of the lubrication oil.

In the above invention, the engine comprises an accumulator supplying power to the electric motor, and a voltage detector detecting an output voltage of the accumulator, and the control device sets the torque gradient and the continuation time based on a voltage drop allowed for releasing the locked state when detecting an output voltage of the accumulator and the output voltage is lower than a predetermined voltage judgment value.

In the above invention, the engine comprises a support structure including a crankcase, and a cylinder block supported by the support structure, the variable compression ratio mechanism includes shafts interposed between the support structure and cylinder block and including eccentric shafts, and the drive device changes a size of the combustion chamber by making the shafts rotate to change a relative position of the cylinder block with respect to the support structure.

In the above invention, the engine comprises a biasing member biasing the cylinder block in a direction separating from the support structure, and the control device sets the torque gradient and the continuation time based on a biasing force of the biasing member when lowering the mechanical compression ratio in a period during which fuel stops being burned in the combustion chamber.

In the above invention, the engine comprises a cylinder internal pressure detector detecting a cylinder internal pressure, and a rotational force estimating device estimating a reverse input torque applied to the output shaft of the clutch, and the control device detects the cylinder internal pressure when lowering the mechanical compression ratio during the operating period of the internal combustion engine, controls the rotating machine so as to start driving the input shaft of the clutch during the period when the cylinder internal pressure is changing from a local maximum point to a local minimum point, estimates the reverse input torque when an amplitude of vibration of a reverse input torque applied to the output shaft of the clutch is less than a predetermined judgment value, and sets the torque gradient and the continuation time based on the reverse input torque.

Advantageous Effects of Invention

According to the present invention, it is possible to provide an internal combustion engine comprising a variable compression ratio mechanism including a reverse input blocking clutch and able to reduce the size of the rotating machine driving the variable compression ratio mechanism.

BRIEF DESCRIPTION OF THE DRAWINGS

FIG. 11 is a graph explaining a condition enabling release of a locked state with respect to an input torque applied to a clutch and an application time applying the input torque in an embodiment.

FIG. 12 is a graph explaining a region enabling release of a locked state with respect to an acceleration of an input shaft and continuation time of continuation of increase of an input torque in a clutch of an embodiment.

FIG. 24 is a flow chart of fourth operational control changing a mechanical compression ratio in an embodiment.

DESCRIPTION OF EMBODIMENTS

Referring to FIG. 1 to FIG. 24, an internal combustion engine in an embodiment will be explained. In the present embodiment, a spark ignition type internal combustion engine mounted in a vehicle will be illustrated for the explanation. The internal combustion engine in the present embodiment comprises a variable compression ratio mechanism able to change a mechanical compression ratio.

Figure 1:
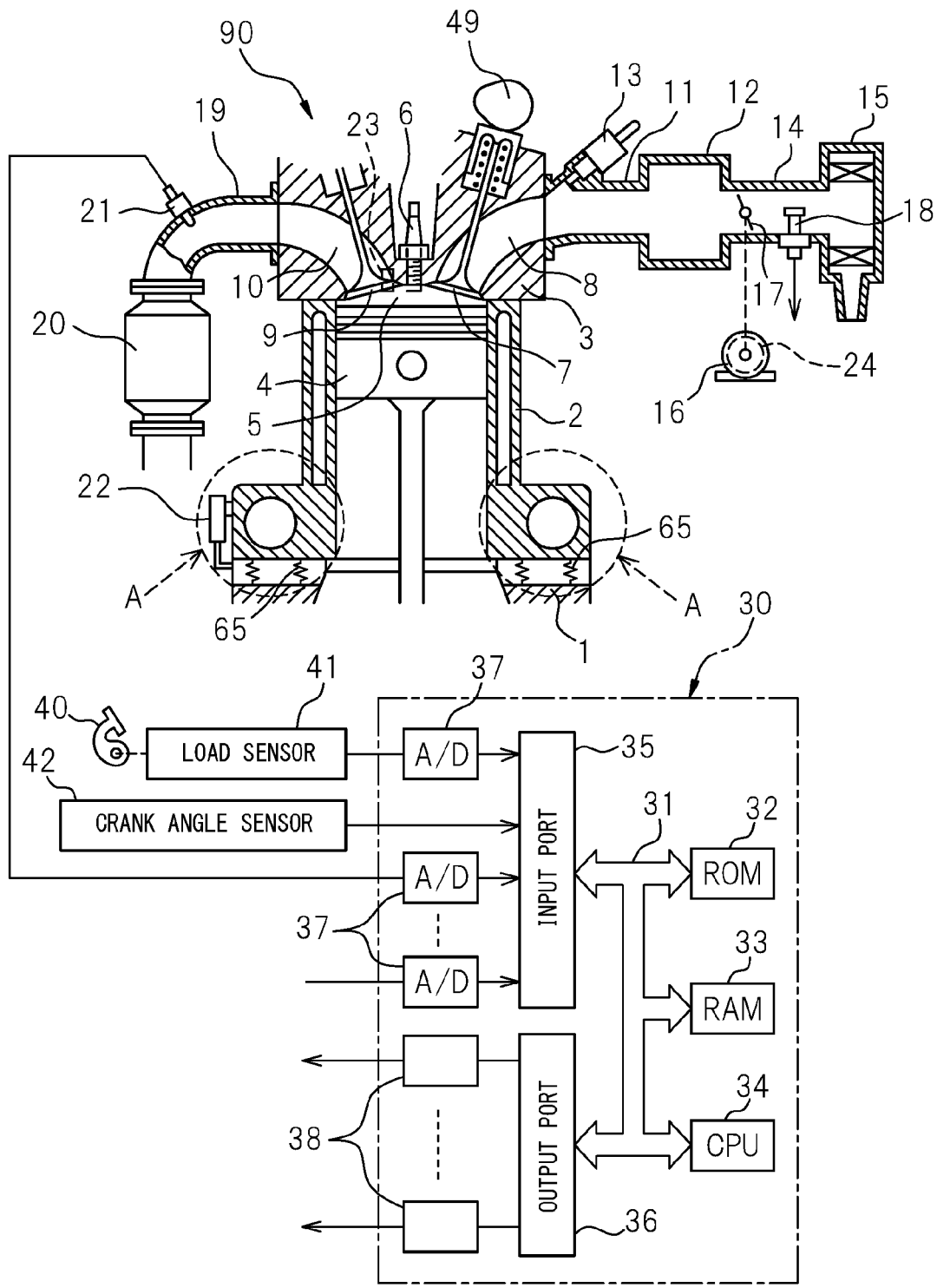
FIG. 1 is a schematic overview of an internal combustion engine in an embodiment.

FIG. 1 is a schematic view of an internal combustion engine in an embodiment. The internal combustion engine comprises an engine 90. The engine 90 comprises a support structure including a crankcase 1. The support structure is formed so as to support a crankshaft. The engine 90 comprises a cylinder block 2 and a cylinder head 3. At a bore part formed at the inside of the cylinder block 2, a piston 4 is arranged. At the center part of a top surface of a combustion chamber 5, a spark plug 6 is arranged. In the present invention, the space surrounded by a crown surface of a piston 4, a bore part of the cylinder block 2, and a cylinder head 3 at any position of the piston 4 will be referred to as a "combustion chamber". Further, as a cylinder internal pressure detector detecting the pressure of a combustion chamber 5, that is, the cylinder internal pressure, a cylinder internal pressure sensor 23 is arranged.

At the cylinder head 3, an intake port 8 and exhaust port 10 are formed. At the end part of the intake port 8, an intake valve 7 is arranged. The intake valve 7 opens and closes by rotation of an intake cam 49. At the end part of the exhaust port 10, an exhaust valve 9 is arranged. The intake port 8 is connected through an intake branch tube 11 to a surge tank 12. At the intake branch tube 11, a fuel injector 13 for injecting fuel toward the inside of the corresponding intake port 8 is arranged. Note that, instead of being attached to the intake branch tube 11, the fuel injector 13 may be arranged to directly inject fuel to the combustion chamber 5.

The surge tank 12 is connected through an intake duct 14 to an air cleaner 15. At the inside of the intake duct 14, a throttle valve 17 driven by an actuator 16 is arranged. Further, at the inside of the intake duct 14, for example, an intake air detector 18 using a hot wire is arranged. On the other hand, the exhaust port 10 is connected through an exhaust manifold 19 to a catalyst device 20, for example, housing a three-way catalyst. At the exhaust manifold 19, an air-fuel ratio sensor 21 is arranged.

The internal combustion engine in the present embodiment comprises a variable compression ratio mechanism A able to change the volume of the combustion chamber 5 at the time when the piston 4 is positioned at compression top dead center. The variable compression ratio mechanism A is formed so as to change the relative position of the cylinder block 2 with respect to the crankcase 1 in the cylinder axial direction. Between the crankcase 1 and the cylinder block 2, biasing members comprised of lift springs 65 are arranged. The lift springs 65 are formed so as to bias the cylinder block 2 in a direction away from the crankcase 1. Note that, the biasing members are not limited to these. Any members biasing the cylinder block in a direction away from the crankcase may be employed.

At the crankcase 1 and cylinder block 2, a relative position sensor 22 is attached for detecting the relative position of the cylinder block 2 with respect to the crankcase 1. From the relative position sensor 22, an output signal showing a change in distance between the crankcase 1 and cylinder block 2 is output. At the actuator 16 for driving the throttle valve, a throttle opening degree sensor 24 generating an output signal showing an opening degree of the throttle valve is attached.

The control device of an internal combustion engine in the present embodiment includes an electronic control unit 30. The electronic control unit 30 in the present embodiment is a digital computer. The digital computer includes components connected with each other by a bidirectional bus 31 such as a ROM (read only memory) 32, RAM (random access memory) 33, CPU (microprocessor) 34, input port 35, and output port 36.

The output signals of the intake air detector 18, air-fuel ratio sensor 21, relative position sensor 22, cylinder internal pressure sensor 23, and throttle opening degree sensor 24 are input through corresponding AD converters 37 to the input port 35. Further, an accelerator pedal 40 has a load sensor 41 generating an output voltage proportional to the amount of depression of the accelerator pedal 40 connected to it. The output voltage of the load sensor 41 is input to a corresponding AD converter 37 to the input port 35. The output of the load sensor 41 can be used to detect the demanded load. Furthermore, a crank angle sensor 42 generating an output pulse every time the crankshaft rotates by for example 300 is connected to the input port 35. The output of the crank angle sensor 42 can be used to detect the crank angle and engine speed.

On the other hand, the output port 36 is connected through corresponding drive circuits 38 to the spark plugs 6, fuel injectors 13, throttle valve drive actuator 16, and variable compression ratio mechanism A. These devices are controlled by the electronic control unit 30.

Figure 2:
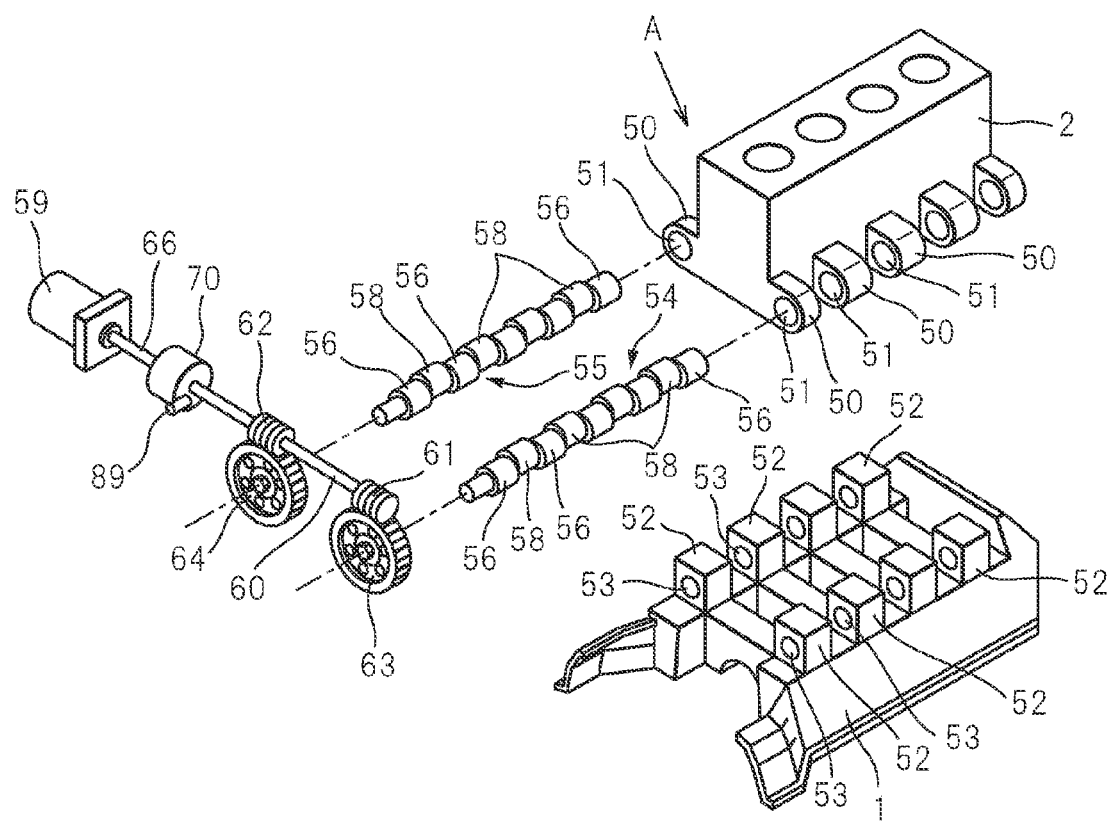
FIG. 2 is a schematic disassembled perspective view of a variable compression ratio mechanism in an embodiment.
Figure 3:
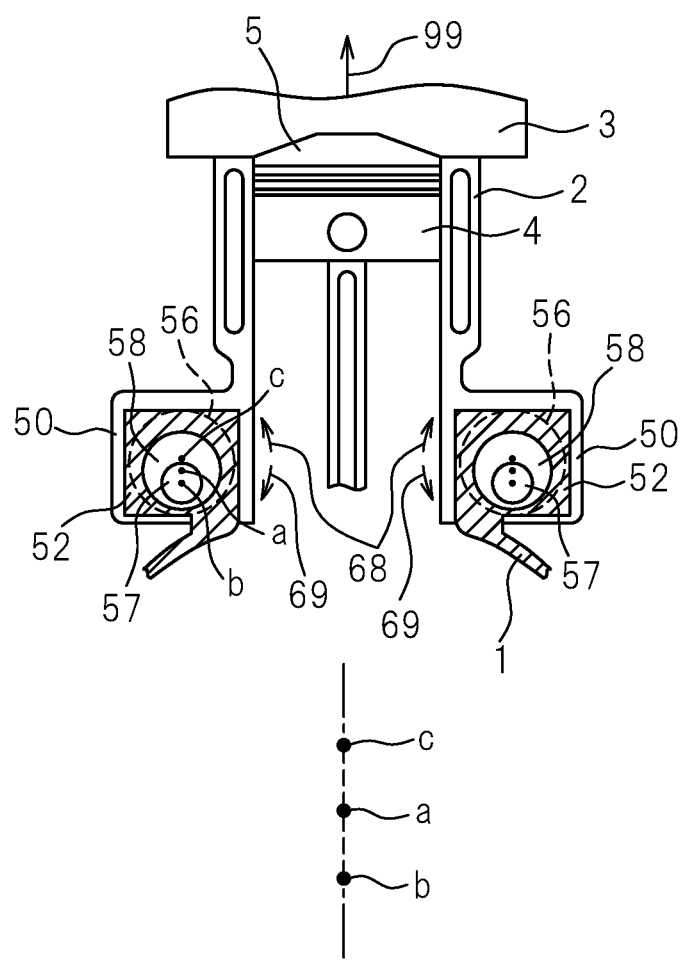
FIG. 3 is a first schematic cross-sectional view of a variable compression ratio mechanism explaining a change of a mechanical compression ratio in an embodiment.

FIG. 2 is a disassembled perspective view of a variable compression ratio mechanism in the present embodiment. FIG. 3 is a first schematic cross-sectional view of a variable compression ratio mechanism in the present embodiment. Referring to FIG. 2 and FIG. 3, below the two side walls of the cylinder block 2, a plurality of projecting parts 50 are formed spaced apart from each other. At each projecting part 50, a cam insertion hole 51 with a circular cross-sectional shape is formed. On the other hand, at the top wall of the crankcase 1, a plurality of projecting parts 52 are formed spaced apart from each other to be fit between the projecting parts 50. At these projecting parts 52 as well, cam insertion holes 53 with circular cross-sectional shapes are formed.

The variable compression ratio mechanism in the present embodiment includes shafts including eccentric shafts comprised of camshafts 54, 55. The camshafts 54, 55 are interposed between the crankcase 1 and cylinder block 2. On each camshaft 54, 55, circular cams 58 are arranged to be inserted in every other cam insertion hole 53 to be able to rotate. These circular cams 58 are coaxial with the axial lines of the camshafts 54, 55. On the other hand, at the both sides of each circular cam 58, as shown in FIG. 3, eccentric shafts 57 arranged off-centered from the axial lines of the camshafts 54, 55 extend. At each eccentric shaft 57, another circular cam 56 is attached off-centered to be able to rotate. As shown in FIG. 2, circular cams 56 are arranged at the both sides of each circular cam 58. These circular cams 56 are inserted in the corresponding cam insertion holes 51 to be able to rotate. The cylinder block 2 is supported by the crankcase 1 through the camshafts 54, 55 including the eccentric shafts 57.

Figure 4:
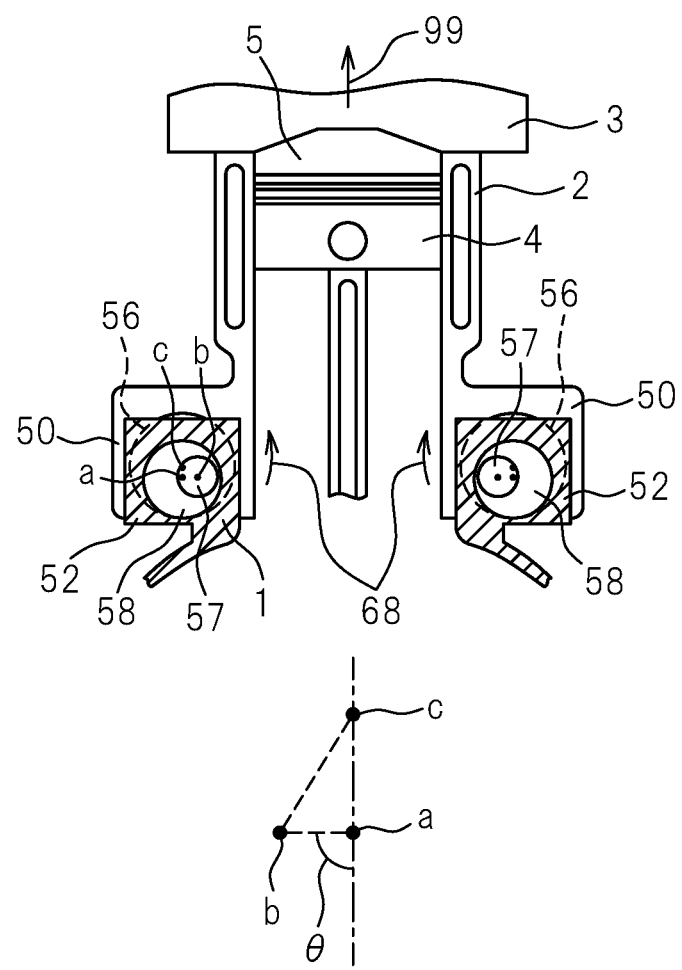
FIG. 4 is a second schematic cross-sectional view of a variable compression ratio mechanism explaining a change of a mechanical compression ratio in an embodiment.
Figure 5:
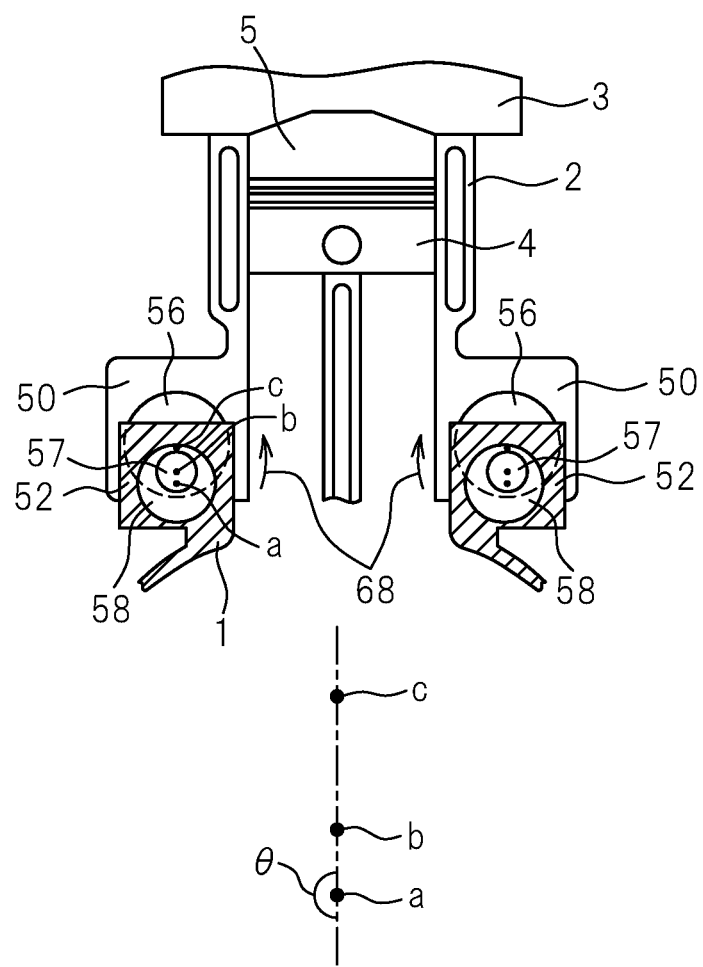
FIG. 5 is a third schematic cross-sectional view of a variable compression ratio mechanism explaining a change of a mechanical compression ratio in an embodiment.

FIG. 4 shows a second schematic cross-sectional view of a variable compression ratio mechanism in the present embodiment. FIG. 5 shows a third schematic cross-sectional view of a variable compression ratio mechanism in the present embodiment. FIG. 3 to FIG. 5 are cross-sectional views explaining the function of the variable compression ratio mechanism when changing the mechanical compression ratio in normal operation. From the state shown in FIG. 3, the circular cam 58 arranged on each camshaft 54, 55 moves in a direction whereby the eccentric shafts 57 approach each other if made to rotate in opposite directions to the other as shown by the arrows 68. The eccentric shafts 57 rotate about the axial lines of the respective camshafts 54, 55. The cylinder block 2, as shown by the arrow 99, moves in a direction away from the crankcase 1. At this time, the circular cams 56 rotate inside the cam insertion holes 51 and, as shown in FIG. 4, change in the positions of the eccentric shafts 57 from low positions to intermediate height positions. Next, furthermore, if making the circular cams 58 rotate in the direction shown by the arrows 68, the cylinder block 2, as shown by the arrow 99, moves in a direction further away from the crankcase 1. As a result, as shown in FIG. 5, the eccentric shafts 57 become the highest position.

FIG. 3 to FIG. 5 show the positional relationship between the center "a" of a circular cam 58, the center "b" of an eccentric shaft 57, and the center "c" of a circular cam 56. As will be understood from a comparison of FIG. 3 to FIG. 5, the relative position of the crankcase 1 and the cylinder block 2 is determined by the distance between the center "a" of the circular cam 58 and the center "c" of the circular cam 56. The larger the distance between the center "a" of the circular cam 58 and the center "c" of the circular cam 56, the further the cylinder block 2 from the crankcase 1. That is, the variable compression ratio mechanism A changes relative position of the crankcase 1 and cylinder block 2 due to the link mechanism using the rotating cams.

If the cylinder block 2 moves away from the crankcase 1, the volume of the combustion chamber 5 at the time when the piston 4 is positioned at compression top dead center increases. If the cylinder block 2 approaches the crankcase 1, the volume of the combustion chamber 5 at the time when the piston 4 is positioned at compression top dead center decreases. Therefore, it is possible to rotate the camshafts 54, 55 to thereby change the volume of the combustion chamber 5 at the time when the piston 4 is positioned at compression top dead center.

Referring to FIG. 2, the variable compression ratio mechanism of the present embodiment includes a drive device for rotating the camshafts 54, 55 for changing the volume of the combustion chambers 5. The drive device includes a rotating machine comprised of a motor 59. Furthermore, the drive device includes a clutch 70, worms 61, 62, worm wheels 63, 64, etc. The shaft 66 is connected to the output shaft of the motor 59 and input shaft of the clutch 70. The shaft 60 is connected to the output shaft of the clutch 70. At the shaft 60, a pair of worms 61, 62 with opposite spiral directions are attached so as to make the camshafts 54, 55 rotate in mutually opposite directions. The worm wheels 63, 64 engaging with the worms 61, 62 are fastened to the ends of the camshafts 54, 55. Note that, the rotating machine of the drive device is not limited to a motor or other electric motor. Any device able to make the input shaft of the clutch 70 rotate can be employed.

In this embodiment, by driving the motor 59, it is possible to change the volume of the combustion chamber 5 at the time when the piston 4 is positioned at compression top dead center over a broad range. The variable compression ratio mechanism is controlled by the electronic control unit 30. The motor 59 making the camshafts 54, 55 rotate are connected through a corresponding drive circuit 38 to the output port 36.

In this way, the variable compression ratio mechanism in the present embodiment is formed so that the volume of the combustion chamber 5 at the time when the piston reaches top dead center can be changed by the cylinder block 2 moving relative to the crankcase 1. In the present embodiment, the compression ratio determined from only the stroke volume of the piston from bottom dead center to top dead center and the volume of a combustion chamber at the time when the piston reaches top dead center will be called the "mechanical compression ratio". The mechanical compression ratio does not rely on the closing timing of the intake valve etc. and can be shown by (mechanical compression ratio)=(volume of combustion chamber at time when piston reaches top dead center+stroke volume of piston)/(volume of combustion chamber at time when piston reaches top dead center).

In the state shown in FIG. 3, the volume of the combustion chamber 5 becomes small and the mechanical compression ratio is high. If the amount of intake air is always constant, the actual compression ratio becomes high. As opposed to this, in the state shown in FIG. 5, the volume of the combustion chamber 5 becomes large and the mechanical compression ratio is low. If the amount of intake air is always constant, the actual compression ratio becomes lower.

The internal combustion engine in the present embodiment can change the mechanical compression ratio during the operating period to thereby change the actual compression ratio. For example, it is possible to use the variable compression ratio mechanism to change the mechanical compression ratio in accordance with the operating state of the internal combustion engine.

Referring to FIG. 3 to FIG. 5, the eccentric shafts 57 rotate about the axes of the camshafts 54, 55, that is, the axes of the circular cams 58. If lowering the mechanical compression ratio, the eccentric shafts 57 are made to rotate in the directions shown by the arrows 68. If making the mechanical compression ratio rise, the eccentric shafts 57 are made to rotate in the direction shown by the arrows 69.

Referring to FIG. 2, the variable compression ratio mechanism in the present embodiment includes a clutch 70 arranged at the drive force transmission path transmitting the rotational force (output torque) output by the motor 59 to the camshafts 54, 55.

The clutch 70 in the embodiment is a so-called "reverse input blocking clutch". The reverse input blocking clutch in the present embodiment is formed to transmit the rotational force from the input shaft to the output shaft and block the rotational force from the output shaft. That is, the clutch 70 is structured so that the rotational force of the shaft 66 transmitted from the motor 59 is transmitted to the worms 61, 62 and the rotational force of the shaft 60 transmitted from the worms 61, 62 is blocked and not transmitted to the motor 59. In the present embodiment, the torque applied to the input shaft of the clutch 70 due to the torque output by the motor 59 will be called the "input torque of the clutch 70". Further, the torque applied to the output shaft of the clutch 70 through the eccentric shafts 57 due to the force acting on the cylinder block 2 will be called the "reverse input torque of the clutch 70".

The clutch 70 of the present embodiment is arranged between the motor 59 and the worm 62, but the invention is not limited to this. It can be arranged at any position at the drive force transmitting path transmitting rotational force of the motor 59 to the camshafts 54, 55. For example, the clutch 70 may be arranged between the worm wheels 63, 64 and the camshafts 54, 55. In this case, clutches can be arranged at the respective camshafts 54, 55.

Figure 6:
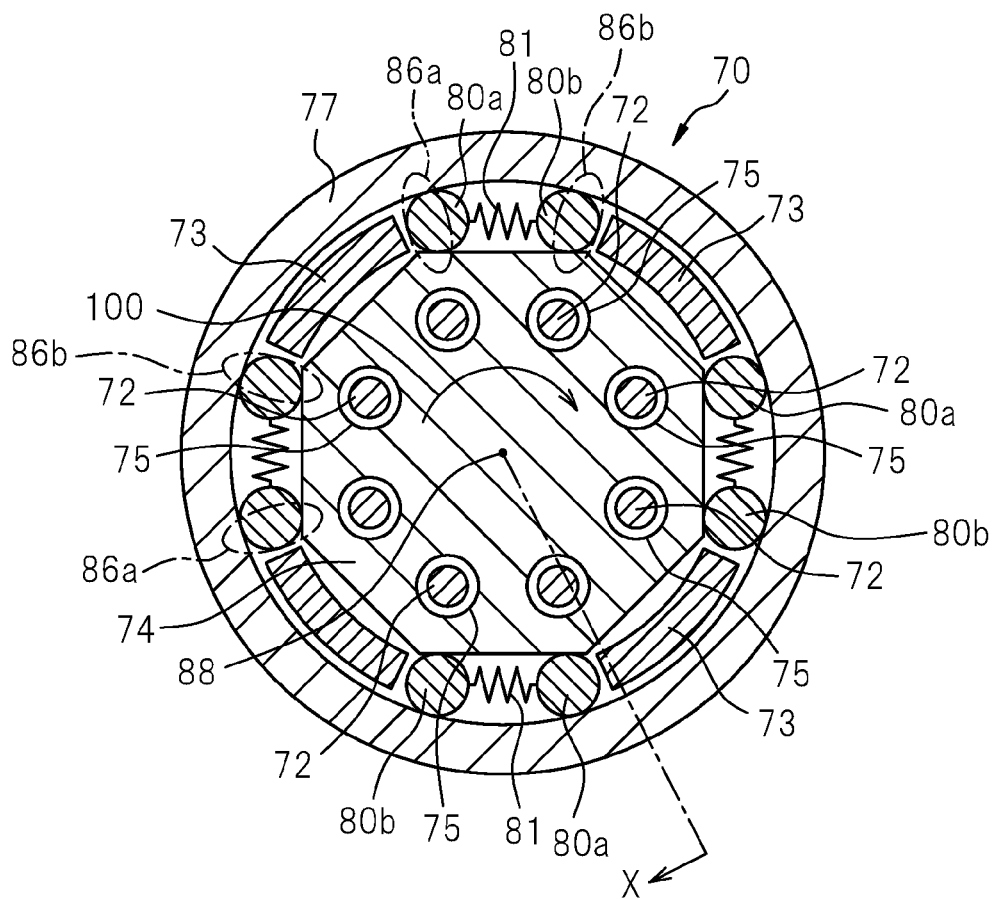
FIG. 6 is a first schematic cross-sectional view of a clutch in an embodiment.
Figure 7:
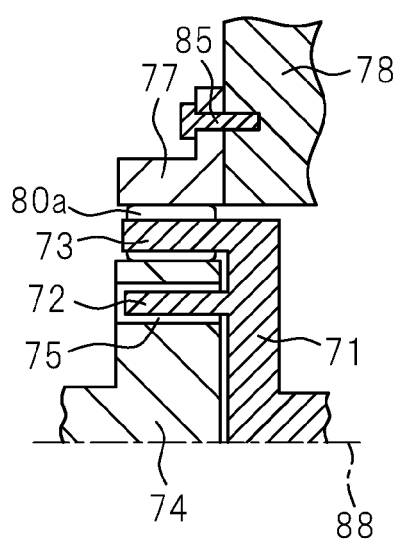
FIG. 7 is a second schematic cross-sectional view of a clutch in an embodiment.

FIG. 6 is a first schematic cross-sectional view of a clutch in the present embodiment. FIG. 7 is a second schematic cross-sectional view of a clutch in the present embodiment. FIG. 7 is a schematic cross-sectional view along the line X in FIG. 6.

Referring to FIG. 6 and FIG. 7, the clutch 70 of the present embodiment includes an outer race 77. The outer race 77 is fastened to the housing 78 by a screw 85. The outer race 77 is fastened so as not to move even during drive of the clutch 70. The clutch 70 has an output shaft 74. The output shaft 74 rotates about a rotation center axis 88. The output shaft 74 is formed with hole parts 75. Several of the hole parts 75 are formed along the circumferential direction of rotation of the output shaft 74. The output shaft 74 in the present embodiment is formed into a polygonal cross-sectional shape.

The clutch 70 includes an input shaft 71. The input shaft 71 rotates about the rotation center axis 88. The input shaft 71 has insertion parts 72 and holding parts 73. The insertion parts 72 and holding parts 73 rotate together.

The plurality of insertion parts 72 are inserted into the hole parts 75 of the output shaft 74. The inside diameters of the hole parts 75 are formed so as to be larger than the outside diameters of the insertion parts 72. Clearances are formed between the insertion parts 72 and the hole parts 75. The plurality of holding parts 73 are arranged between the outer race 77 and the output shaft 74. Further, the holding parts 73 face rollers 80a, 80b.

In the space between the output shaft 74 and the outer race 77, rollers 80a, 80b are arranged. The rollers 80a, 80b in the present embodiment are formed into columnar shapes. Between the rollers 80a and the rollers 80b, springs 81 are arranged. The springs 81 bias the rollers 80a, 80b in directions away from each other.

Due to the output shaft 74 and the outer race 77, engagement parts 86a, 86b for engaging with the rollers 80a, 80b are formed. The engagement parts 86a, 86b are parts where the distances between the outer surface of the output shaft 75 and the inner surface of the outer race 77 become gradually narrower along the direction in which the rollers 80a, 80b are biased. Further, the engagement parts 86a, 86b are formed narrow so that the rollers 80a, 80b cannot pass through them.

Next, the operation of the clutch 70 in the present embodiment will be explained. The clutch 70 in the present embodiment transmits rotational force of the motor 59 to the output shaft 74 if that rotational force is input to the input shaft 71. On the other hand, the clutch 70 is locked and blocks rotational force from the camshaft 54, 55 sides if this rotational force is transmitted to the output shaft 74. In particular, the clutch 70 blocks this rotational force if rotational force causing rotation in a direction of rotation where the mechanical compression ratio lowers is transmitted to the worms 61, 62.

Referring to FIG. 1, in the present embodiment, due to the lift springs 65, the cylinder block 2 is biased in a direction moving away from the crankcase 1. During the operating period of the internal combustion engine, due to the effect of gravity or the effect of the combustion chamber 5 becoming a negative pressure in the intake stroke of the combustion cycle, force acts in a direction where the cylinder block 2 approaches the crankcase 1. However, due to the provision of the lift springs 65, the cylinder block 2 is constantly biased in a direction making it move away from the crankcase 1 and vibration etc. can be kept from occurring at the cylinder block 2. Furthermore, every time fuel is burned in the combustion chamber 5, due to the cylinder internal pressure, force acts in a direction where the cylinder block 2 moves away from the crankcase 1.

The biasing force in a direction where the cylinder block 2 moves away from the crankcase 1 is transmitted to the camshafts 54, 55 and converted to rotational force. The rotational force generated at the camshafts 54, 55 is transmitted through the worm wheels 63, 64 and worms 61, 62 to the output shaft 74 of the clutch 70. Referring to FIG. 6, the arrow 100 is the direction corresponding to the direction by which the cylinder block 2 rises with respect to the crankcase 1. That is, this shows the rotational direction where the mechanical compression ratio becomes smaller and the combustion chamber 5 at the time when the piston 4 reaches top dead center becomes larger. The cylinder block 2 is constantly acted on by force in a direction making it move away from the crankcase 1, while the output shaft 74 is acted on by a force in a direction shown by the arrow 100. That is, a reverse input torque acts in the direction shown by the arrow 100.

Each roller 80a is pushed by the spring 81 and contacts the engagement part 86a. For this reason, a wedge effect occurs at the roller 80a, the rotation of the output shaft 74 with respect to the outer race 77 is obstructed, and the output shaft 74 is locked. In this way, the clutch 70 can block the rotational force from the output side corresponding to the direction in which the cylinder block 2 moves away from the crankcase 1. Further, similarly, when a rotational force in a direction opposite to the arrow 100 is applied to the output shaft 74, each roller 80b contacts the engagement part 86b and the output shaft 74 is locked. When not driving the motor 59, the rollers 80a, 80b engage with the engagement parts 86a, 86b and the clutch 70 locks the output shaft 74.

Figure 8:
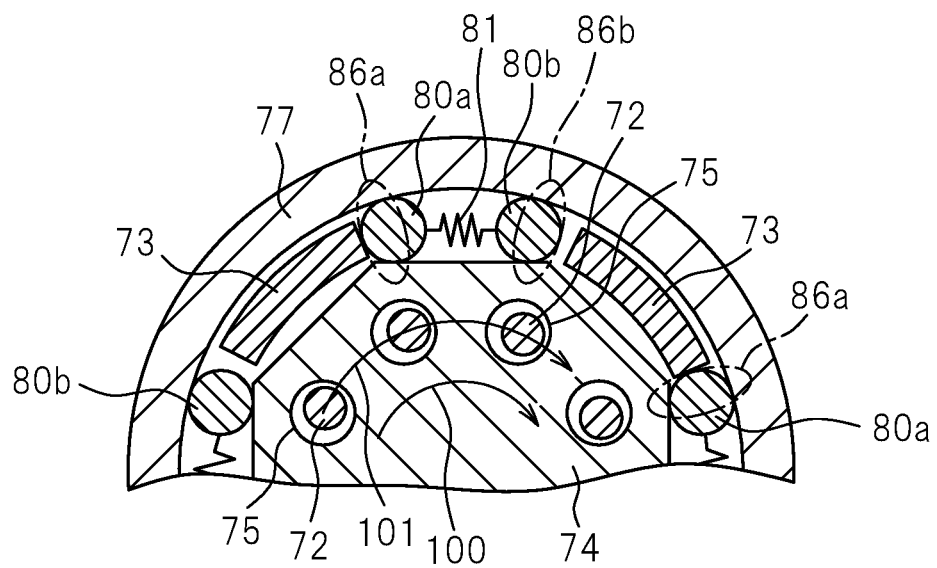
FIG. 8 is a first schematic cross-sectional view of a clutch when lowering a mechanical compression ratio in an embodiment.

FIG. 8 is a first schematic cross-sectional view of a clutch 70 explaining the operation when lowering the mechanical compression ratio. When lowering the mechanical compression ratio, the cylinder block 2 is made to move in a direction moving away from the crankcase 1. By driving the motor 59, the insertion parts 72 of the input shaft 71 rotate in the direction shown by the arrow 101. Before the insertion parts 72 contact the inside surfaces of the hole parts 75, the holding parts 73 contact the rollers 80a.

Figure 9:
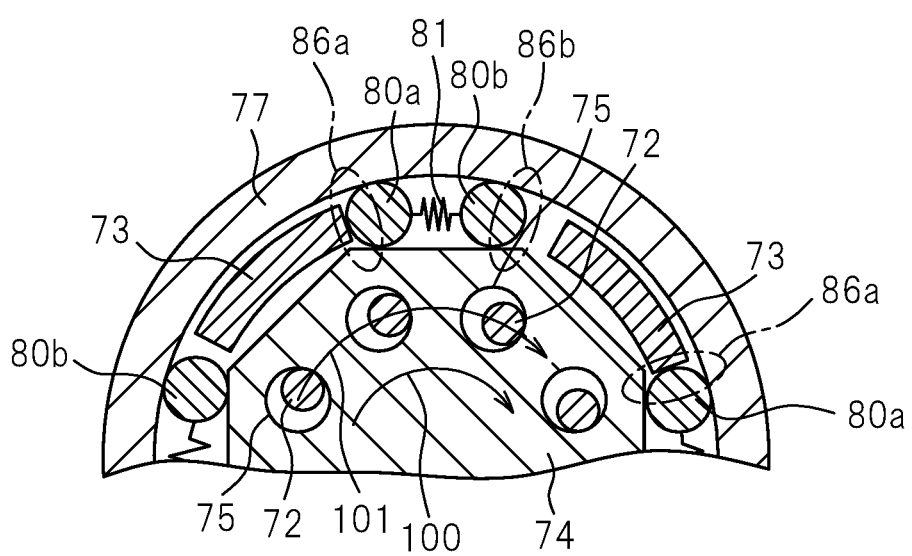
FIG. 9 is a second schematic cross-sectional view of a clutch when lowering a mechanical compression ratio in an embodiment.

FIG. 9 is a second schematic cross-sectional view of a clutch 70 explaining the operation when lowering the mechanical compression ratio. By making the input shaft 71 further rotate, the holding parts 73 push against the rollers 80a. The rollers 80a separate from the engagement parts 86a. The output shaft 74 is released from its locked state and can rotate with respect to the outer race 77 in the direction shown by the arrow 101. The insertion parts 72 of the input shaft 71 rotate in the direction shown by the arrow 101, whereby the insertion parts 72 push against the hole parts 75 of the output shaft 74 and make the output shaft 74 rotate. At this time, the output shaft 74 rotates in a direction whereby the rollers 80b move away from the engagement parts 86b, so the locked state due to the rollers 80b is also released.

Figure 10:
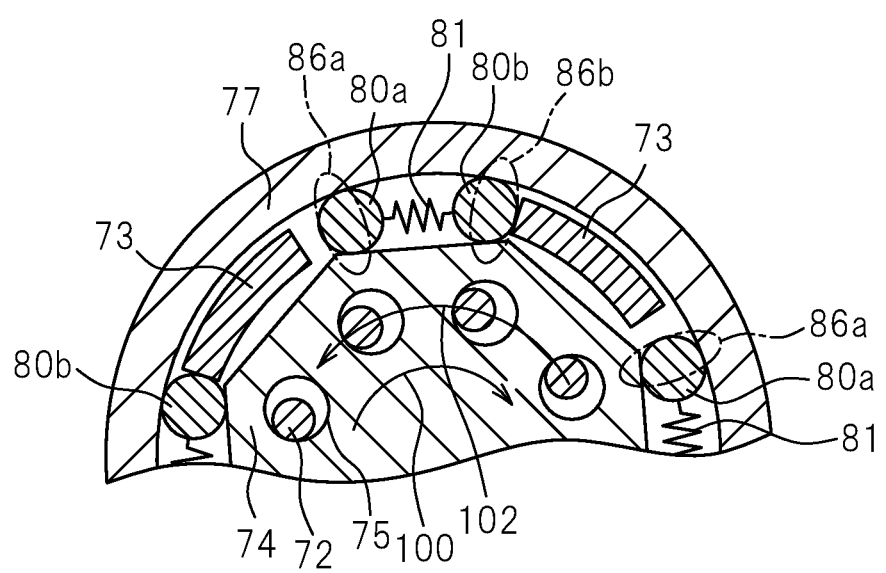
FIG. 10 is a schematic cross-sectional view of a clutch when raising a mechanical compression ratio in an embodiment.

FIG. 10 is a schematic cross-sectional view of a clutch 70 explaining the operation when raising the mechanical compression ratio. When raising the mechanical compression ratio, the cylinder block 2 is made to move in a direction approaching the crankcase 1. By driving the motor 59, the insertion parts 72 and holding parts 73 of the input shaft 71 are made to rotate in the direction shown by the arrow 102.

By making the insertion parts 72 and holding parts 73 of the input shaft 71 rotate in the direction shown by the arrow 102, the holding parts 73 push against the rollers 80b. The rollers 80b separate from the engagement parts 86b whereby the wedge effect of the rollers 80b disappears. Next, the insertion parts 72 of the input shaft 71 push against the hole parts 75 of the output shaft 74 whereby the rotational force of the input shaft 71 can be transmitted to the output shaft 74. The output shaft 74 rotates in the direction shown by the arrow 102. At this time, the output shaft 74 rotates in a direction whereby the rollers 80a separate from the engagement parts 86a, so the locked state of the rollers 80a is also released. In this way, it is possible to transmit the rotational force of the input shaft 71 to the output shaft 74.

In this regard, the internal combustion engine of the present embodiment performs control for driving the variable compression ratio mechanism in the period when stopping the engine 90. Here, "stopping the engine 90" shows the state not only when fuel stops being burned in the combustion chambers 5, but also when the torque output from the engine 90 is zero. That is, it shows the state when the engine speed is zero. Even in such a state where the engine 90 is stopped, for example, sometimes the mechanical compression ratio is changed to confirm the presence of any abnormality in the variable compression ratio mechanism.

Referring to FIG. 1, in the period when the engine 90 is stopped, fuel stops being burned at the combustion chambers 5. For this reason, the force applied to the cylinder block 2 due to the cylinder internal pressure is zero. However, due to the lift springs 65 arranged between the crankcase 1 and the cylinder block 2, the cylinder block 2 is biased in a direction moving away from the crankcase 1.

Referring to FIG. 2, the force acting on the cylinder block 2 is input through the camshafts 54, 55, worm wheels 63, 64, worms 61, 62, and shaft 60 to the output shaft 74 of the clutch 70. The direction of the reverse input torque input to the output shaft 74 at this time is the direction whereby the cylinder block 2 moves away from the crankcase 1.

Referring to FIG. 6, even during the period when the engine 90 is stopped, at the clutch 70, a reverse input torque shown by the arrow 100 is applied to the output shaft 74. The rollers 80a engage with the engagement parts 86a and the transmission of reverse input torque to the input shaft 71 is blocked in this state. That is, the clutch 70 is in a locked state.

When raising the mechanical compression ratio during the stopped period of the engine 90, similar control as during the operating period of the engine 90 can be used to release the locked state. Further, it is possible to release the locked state of the clutch 70 by a relatively small input torque. That is, as shown in FIG. 10, by using the motor 59 to make the input shaft 71 rotate in the direction shown by the arrow 102, the locked state due to the rollers 80b is released and the mechanical compression ratio can be raised. The output torque of the motor 59 at this time can be controlled to a predetermined set value.

On the other hand, when lowering the mechanical compression ratio during the stopped period of the engine 90, as shown in FIG. 8 and FIG. 9, the motor 59 is used to make the input shaft 71 rotate in the direction shown by the arrow 101 and thereby make the rollers 80a separate from the engagement parts 86a. During the stopped period of the engine 90, the reverse input torque applied to the output shaft 74 becomes substantially constant in state. Further, the cylinder block 2 is biased in a direction moving away from the crankcase 1. For this reason, when lowering the mechanical compression ratio, if it is possible to release the locked state of the clutch 70, it is possible to easily lower the mechanical compression ratio by a small torque.

Here, the inventors discovered that when releasing the locked state of the clutch 70, whether or not release is possible does not depend on only the magnitude of the final input torque input to the input shaft 71, but is related to the speed of rise of the input torque of the input shaft 71, that is, the torque gradient. Furthermore, the inventors discovered that to release the locked state, it is necessary to make the rise of the input torque continue for a predetermined time. In the present embodiment, the time for continuation of the increase of the input torque of the clutch 70 will be called the "continuation time", while the time of applying the input torque to the clutch 70 will be called the "application time". The application time is the continuation time or more.

FIG. 11 is a graph explaining the state of unlocking with respect to the application time and input torque of the clutch 70 when lowering the mechanical compression ratio. A constant reverse input torque is applied to the output shaft 74 of the clutch 70. An example succeeding in releasing the locked state of the clutch 70 is shown by the solid line. Further, Comparative Example 1 failing in releasing the locked state is shown by a one-dot chain line and Comparative Example 2 is shown by a two-dot chain line.

In control of this embodiment, the gradient of the input torque is large and the locked state is released at the application time $t_{id}$. At the application time $t_{id}$, the torque becomes the input torque $T_{id}$. As opposed to this, in the control of Comparative Example 1, the gradient of the input torque $T_i$ is set small. In this case, the input torque is gradually increased, but the locked state of the clutch 70 is maintained without being released. Further, in Comparative Example 2, the gradient of the input torque is large, but the continuation time of continuation of increase of the torque is short and the rise of input torque is stopped at the input torque $T_{in}$. As a result, the locked state is maintained without being released. In this way, the inventors discovered that to release the locked state of the clutch 70, the gradient of the input torque and the continuation time of continuation of the increase of the input torque are important factors.

FIG. 12 shows a graph explaining an area where the locked state of the clutch can be released with respect to acceleration of the input shaft of the clutch and continuation time. The abscissa shows the acceleration of the input shaft 71 corresponding to the gradient of the input torque. The ordinate is the continuation time of continuation of rise of torque.

The solid line shows a graph of addition of the reverse input torque $M_1$ to the output shaft 74. If the acceleration of the input shaft is less than the acceleration $\alpha_{i1}$, it is not possible to release the locked state of the clutch 70 even if lengthening the continuation time. This area is the area where the torque gradient is insufficient. Further, if lengthening the continuation time at the acceleration $\alpha_{i1}$ of the input shaft or more, it is possible to release the locked state. To release the locked state at the acceleration $\alpha_{i1}$ of the input shaft, a time of the continuation time $t_{i1}$ or more becomes necessary. On the other hand, if the continuation time is shorter than a predetermined time, it is not possible to release the locked state. This area becomes the area at which the continuation time is insufficient. The continuation time $t_i$ required for releasing the locked state becomes shorter the larger the acceleration $\alpha_i$ of the input shaft. The input shaft acceleration $\alpha_{im}$ is the maximum acceleration of the input shaft which the motor 59 can output. In the input shaft acceleration $\alpha_{im}$, a continuation time $t_{i1m}$ or more is the time required for unlocking. In this way, the motor of the present embodiment releases the locked state by continuation of the rise of the torque gradient over a predetermined time in the state larger than the acceleration $\alpha_{i1}$ of the input shaft to the input shaft acceleration $\alpha_{im}$ or less.

FIG. 12 shows a graph in the case where the reverse input torque changes. The reverse input torque $M_2$ is larger than the reverse input torque $M_1$. When the reverse input torque $M_1$ changes to the reverse input torque $M_2$, as shown by the arrow 105, the area enabling release of the locked state of the clutch 70 shifts. In the case of the reverse input torque $M_2$, an acceleration of the input shaft of the acceleration $\alpha_{i2}$ or more is necessary for releasing the locked state of the clutch 70. At the time of the acceleration $\alpha_{i2}$ of the input shaft, a time of the continuation time $t_{i2}$ or more is necessary. Further, in the case of the maximum acceleration $\alpha_{im}$ of the input shaft of the motor 59, a time of the continuation time $t_{i2m}$ or more is required for the release of the locked state.

As shown in FIG. 8, before releasing the locked state of the clutch 70, the rollers 80a are caught in the engagement parts 86a comprised of the output shaft 74 and outer race 77. To start the detachment of the rollers 80a from the engagement parts 86a, it is believed necessary to make the input shaft 71 turn by a predetermined size or more of torque gradient. Further, after the rollers 80a start to detach, to make the roller 80a separate from the engagement parts 86a and completely release the locked state, it is believed necessary to continue the pushing action on the rollers 80a for a predetermined continuation time. In the present embodiment, the gradient of the input torque of the clutch 70 and the continuation time of continuation of increase of the input torque are set to release the locked state of the clutch.

Referring to FIG. 12, if the reverse input torque M of the clutch 70 is determined, it is possible to select the torque gradient and continuation time corresponding to the reverse input torque M to release the locked state of the clutch 70. For the acceleration $\alpha_i$ of the input shaft, it is possible to select any value enabling release of the locked state. In the present embodiment, an area in which the gradient of the input torque becomes large is selected. The maximum input shaft acceleration $\alpha_{im}$ in the area enabling release of the locked state of the clutch 70 is selected. By increasing the acceleration $\alpha_i$ of the input shaft and shortening the continuation time $t_i$, it is possible to reduce the amount of power required for releasing the locked state. That is, it is possible to keep down the power consumed for releasing the locked state of the clutch 70. Further, it is possible to improve the response in release of the locked state.

Figure 13:
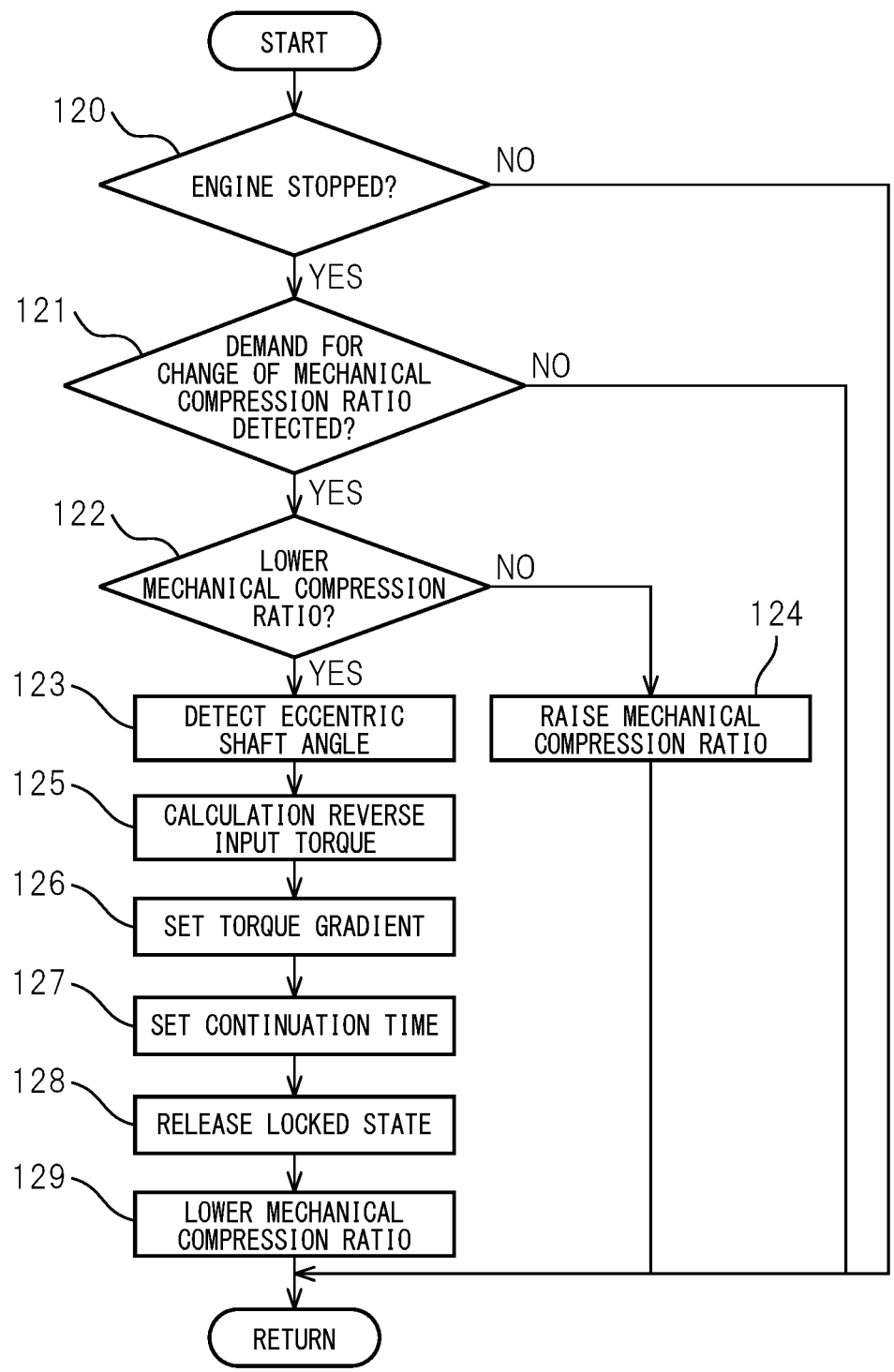
FIG. 13 is a flow chart of first operational control changing a mechanical compression ratio in an embodiment.

FIG. 13 shows a flow chart of first operational control changing the mechanical compression ratio in the present embodiment. The operational control shown in FIG. 13 can be repeatedly performed by the electronic control unit 30, for example, every predetermined time interval.

At step 120, it is judged if the state is one in which the engine 90 is stopped. For example, it is judged if the engine speed is zero. When at step 120 the engine 90 is in the middle of the operating period, this control is ended. When at step 120 the engine 90 is in the middle of the stopped period, the routine proceeds to step 121.

At step 121, it is judged if a demand for change of the mechanical compression ratio has been detected. If a demand for change of the mechanical compression ratio has not been detected, this control is ended. If detecting a demand for change of the mechanical compression ratio, the routine proceeds to step 122.

Next, at step 122, it is judged if the mechanical compression ratio will be lowered. If at step 122 judging that the mechanical compression ratio will be raised, the routine proceeds to step 124. At step 124, the mechanical compression ratio is raised to the target mechanical compression ratio. In this case, it is possible to release the locked state by supplying current to the motor 59 so as to obtain the predetermined torque gradient and continuation time. After releasing the locked state, it is possible to raise the mechanical compression ratio to the target compression ratio. If at step 122 judging that the mechanical compression ratio will be lowered, the routine proceeds to step 123.

At step 123, the eccentric shaft angle θ at the current mechanical compression ratio is calculated. Referring to FIG. 3 to FIG. 5, in the present embodiment, the angle formed by the line connecting the center "a" of the circular cam 58 and the center "b" of the eccentric shaft 57 and the direction of movement of the cylinder block 2 is referred to as the "angle θ of the eccentric shaft". Referring to FIG. 3, in the present embodiment, in the state where the mechanical compression ratio is the highest, the eccentric shaft angle θ is 0°. The lower the mechanical compression ratio, the greater the eccentric shaft angle θ. Further, as shown in FIG. 5, in the state where the mechanical compression ratio is the smallest, the eccentric shaft angle θ is substantially 180°.

The eccentric shaft angle θ can be calculated based on the current mechanical compression ratio. The eccentric shaft angle θ, for example, can be calculated based on the relative position detected by the relative position sensor 22 (see FIG. 1).

Referring to FIG. 13, at step 125, the reverse input torque applied to the output shaft 74 of the clutch 70 is calculated. Here, the method of calculation of the reverse input torque applied to the output shaft 74 of the clutch 70 during the stopped period of the engine 90 will be explained.

Figure 14:
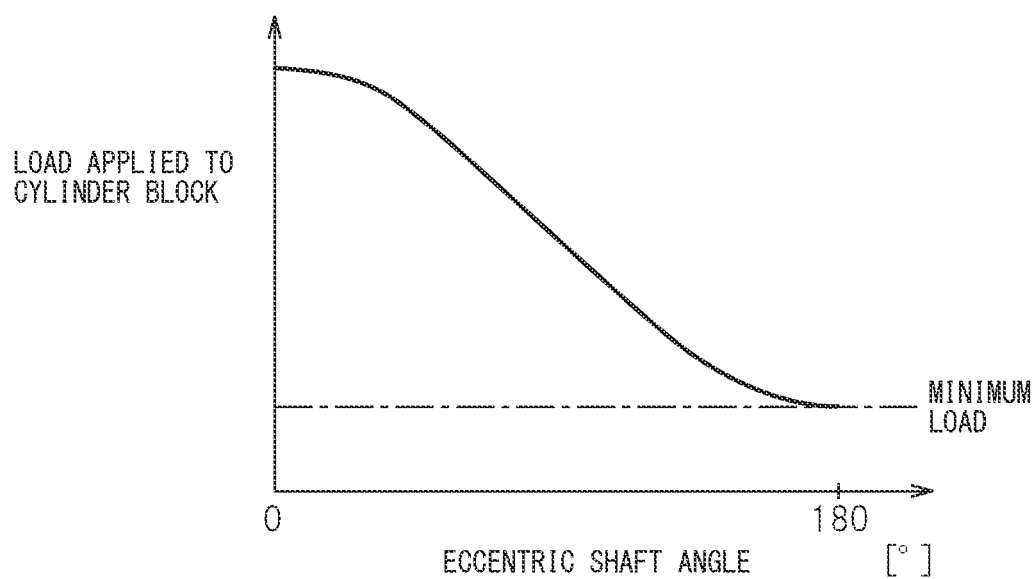
FIG. 14 is a graph of a load applied to a cylinder block by lift springs with respect to an eccentric shaft angle in an embodiment.

FIG. 14 is a graph of the load applied to the cylinder block 2 with respect to the eccentric shaft angle in a link mechanism of the variable compression ratio mechanism. The ordinate shows the load applied to the cylinder block 2 by the lift springs 65 (see FIG. 1). The lower the mechanical compression ratio, the further the cylinder block 2 from the crankcase 1, so the contraction of the lift springs 65 is reduced. For this reason, the larger the eccentric shaft angle θ, the smaller the load applied to the cylinder block 2. Even if the eccentric shaft angle becomes 180°, the lift springs 65 are contracted in state and the minimum load is applied to the cylinder block 2. In this way, the load applied from the lift springs 65 to the cylinder block 2 is determined based on the eccentric shaft angle.

Figure 15:
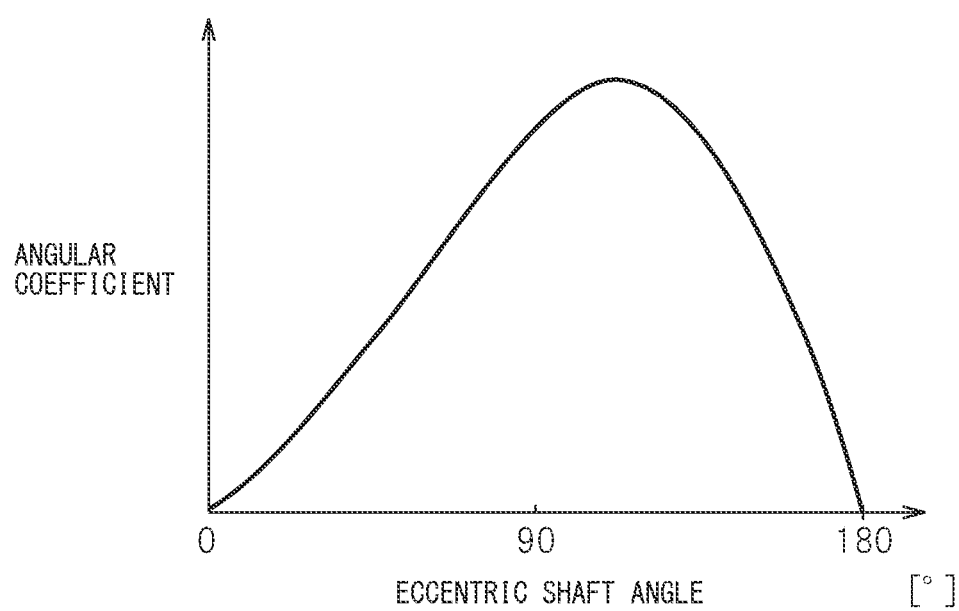
FIG. 15 is a graph of an angular coefficient by which a link mechanism transmits rotational force with respect to an eccentric shaft angle in an embodiment.

FIG. 15 shows a graph of the angular coefficient with respect to the eccentric shaft angle. The angular coefficient of the ordinate corresponds to the transmission rate of the force when the load applied to the cylinder block 2 is transmitted to the worm wheels 63, 64 by the link mechanism. Depending on the state of the link mechanism, that is, the eccentric shaft angle θ, the rotational force transmitted to the worm wheels 63, 64 changes. The larger the angular coefficient, the larger the torque transmitted to the worm wheels 63, 64.

Figure 16:
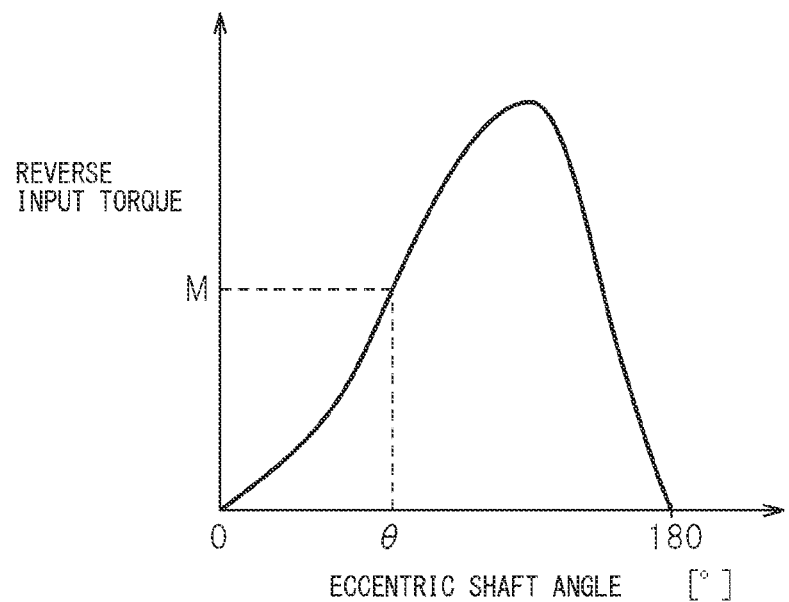
FIG. 16 is a graph of a reverse input torque of a clutch with respect to an eccentric shaft angle in an embodiment.

FIG. 16 is a graph showing the reverse input torque with respect to the eccentric shaft angle. By multiplying the load applied to the cylinder block 2 shown in FIG. 14 with the angular coefficient shown in FIG. 15, it is possible to calculate the torque applied to the worm wheels 63, 64. Further, it is possible to calculate the reverse input torque applied to the output shaft 74 of the clutch 70 based on the gear ratio of the worm wheels 63, 64 and the worms 61, 62. It will be understood that the reverse input torque is a function of the eccentric shaft angle. In this way, based on the relative position of the cylinder block 2 with respect to the crankcase 1, the reverse input torque can be calculated.

Referring to FIG. 13, next, based on the reverse input torque applied to the output shaft 74, the torque gradient required for releasing the locked state of the clutch 70 and the continuation time for increasing the input torque are set.

At step 126, the torque gradient input to the input shaft 71 of the clutch 70 is set. At step 127, the continuation time for raising the torque by the set torque gradient is set. For the torque gradient and continuation time, for example, values set as functions of the reverse input torque are determined in advance. Referring to FIG. 12, for example, in the case of the reverse input torque $M_1$, a torque gradient corresponding to the acceleration $\alpha_{im}$ of the input shaft is set. Furthermore, an application time comprised of the continuation time $t_{i1m}$ plus an extra margin is selected.

Next, at step 128, the locked state is released. The control device supplies power to the motor 59 so as to obtain the set torque gradient and application time.

Figure 17:
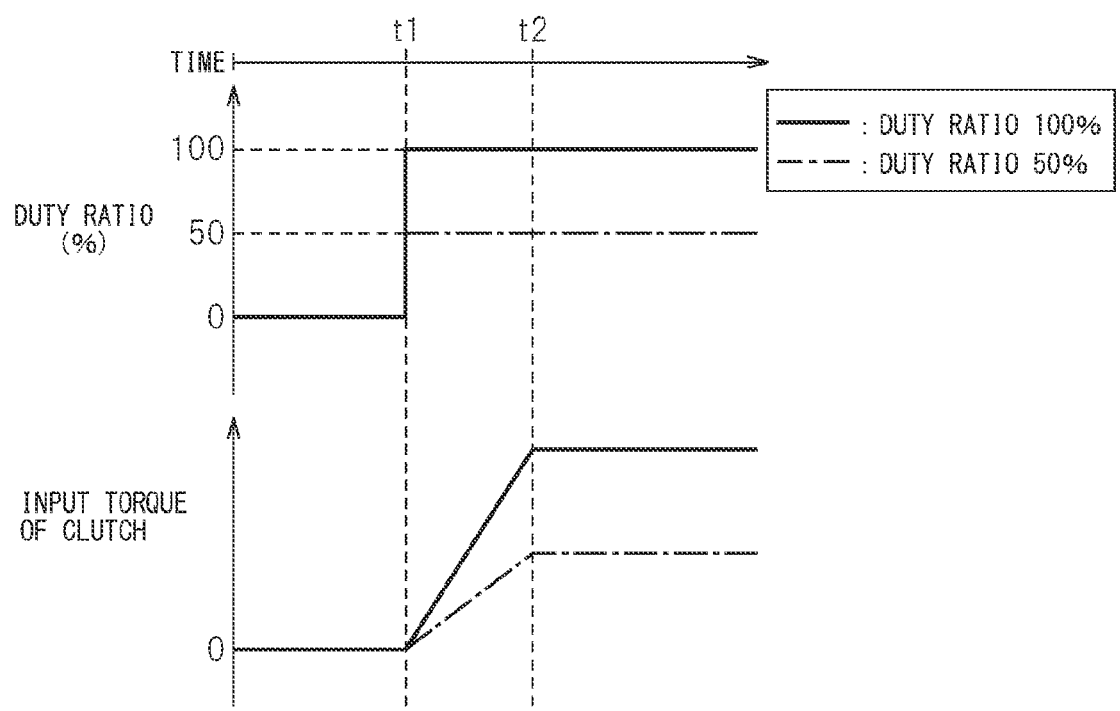
FIG. 17 is a graph of an output torque of a motor when changing a duty ratio of a motor in an embodiment.

FIG. 17 is a graph explaining the relationship between the current supplied to the motor and the input torque of the clutch. The input torque of the clutch 70 corresponds to the output torque of the motor 59. In the present embodiment, the motor 59 is controlled by duty ratio control. That is, the ratio of the time of supplying current to the motor 59 and the time of stopping the supply of current is changed so as to adjust the torque gradient of the output of the motor 59.

The graph where the duty ratio is 100% is shown by the solid line, while the graph where the duty ratio is 50% is shown by the one-point chain line. At the time t1, the motor 59 is started. Further, at the time t2, the input torque of the clutch 70 after reaching the predetermined value then becomes constant. In control with a duty ratio of 100%, the speed of rise of the output torque of the motor, that is, the torque gradient applied to the input shaft 71 of the clutch 70 becomes greater than control with a duty ratio of 50%. By increasing the duty ratio, it is possible to increase the torque gradient input to the input shaft 71. In the present embodiment, the duty ratio of the current supplied to the motor is changed so as to change the torque gradient.

Referring to FIG. 13, at step 128, it is possible to release the locked state. The control device supplies current to the motor 59 by the set application time and duty ratio. The locked state of the clutch 70 is released.

Next, at step 129, the mechanical compression ratio falls to the target mechanical compression ratio. After releasing the locked state of the clutch 70, even if reducing the input torque of the clutch 70, it is possible to lower the mechanical compression ratio. The control device can reduce the mechanical compression ratio to the target mechanical compression ratio by a predetermined low current value. When the mechanical compression ratio reaches the target mechanical compression ratio, this control is ended.

In this way, the control device of an internal combustion engine in the present embodiment estimates the reverse input torque applied to the output shaft of the clutch. Based on the reverse input torque, the torque gradient which the motor outputs and the continuation time of continuation of the increase of the torque are set. Based on the continuation time, the application time is set. Further, based on the set torque gradient and the application time, the torque is increased so as to release the locked state of the clutch. By employing this control, it is possible to optimize the torque output by the motor and the power supplied to the motor. For this reason, it is possible to keep the required capacity of the motor from becoming excessive and possible to make the motor smaller in size. Further, it is possible to reduce the power supplied to the motor.

In the present embodiment, as the rotating machine, an electric motor is employed. The control device changes the pattern of supply of power to the electric motor to control the torque gradient. Further, the time for supplying power to the electric motor is changed to control the continuation time. By performing this control, it is possible to easily control the torque gradient applied to the input shaft of the clutch and the continuation time.

Note that, the rotating machine of the variable compression ratio mechanism is not limited to an electric motor. It is possible to employ any rotating machine able to rotate the input shaft of the clutch. For example, the rotating machine may be formed so as to rotate the input shaft of the clutch by an actuator using hydraulic pressure.

Next, second operational control of the present embodiment will be explained. At the inside of the clutch 70, there are sliding parts, so the inside of the clutch 70 is supplied with lubrication oil. When releasing the locked state of the clutch 70, the outer race 77 and output shaft 74 slide with respect to the rollers 80a, 80b. The variable compression ratio mechanism in the present embodiment comprises a lubrication oil supply device supplying lubrication oil to the inside of the clutch 70. In the second operational control, in consideration of the state of the lubrication oil, the mechanical compression ratio is lowered.

In the present embodiment, the clutch 70 is arranged in an atmosphere of vapor of lubrication oil. The engine 90 is closed by a boot seal so that the vapor of the oil stored in the oil pan does not leak to the outside. The clutch 70 is arranged at the inside of the sealed space of the engine 90. The oil pan and the sealing member function as a lubrication oil supply device. Note that, the lubrication oil supply device is not limited to this. For example, it may also be formed so as to supply lubrication oil directly to the inside of the clutch 70.

In the second operational control of the present embodiment, the friction coefficient at the sliding parts inside of the clutch 70 is estimated and based on the friction coefficient, the torque gradient and continuation time required for releasing the locked state of the clutch 70 are set. By the friction coefficient becoming smaller, the torque gradient required for releasing the locked state can be made smaller and the continuation time can also be shortened.

Figure 18:
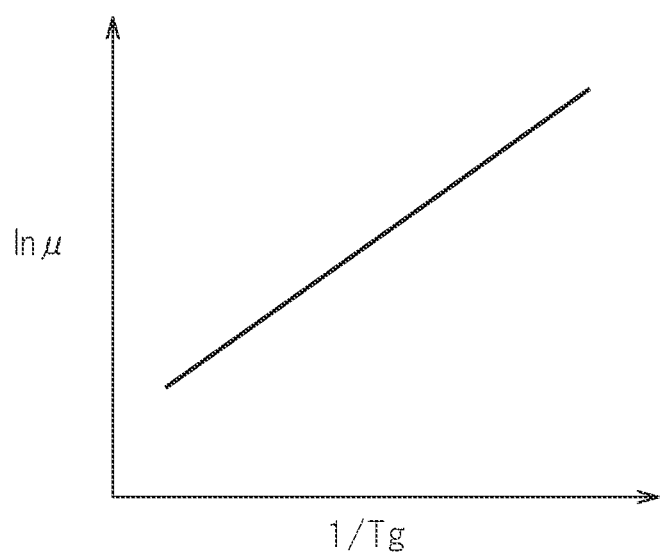
FIG. 18 is a graph of a friction coefficient at contact surfaces of rollers of a clutch in an embodiment.

FIG. 18 is a graph showing the relationship of the temperature of the lubrication oil and the friction coefficient. When releasing the locked state of the clutch 70, the static friction coefficient becomes dominant over the kinetic friction coefficient. The friction coefficient μ here shows the static friction coefficient at the contact surfaces of the rollers 80a, 80b. For example, when the clutch 70 is in the locked state, the rollers 80a, 80b and the outer race 77 directly contact each other. Further, an oil film is formed by the chemical reaction at the region between the rollers 80a, 80b and outer race 77. The higher the temperature Tg of the lubrication oil, the more the friction coefficient μ falls. Based on the relationship shown in FIG. 18, the temperature Tg of the lubrication oil can be used to calculate the friction coefficient μ.

The variable compression ratio mechanism of the present embodiment includes a temperature detector detecting the temperature of the lubrication oil. The temperature detector of the present embodiment detects the temperature of the lubrication oil stored in the oil pan. Further, it is possible to calculate the friction coefficient based on the temperature of lubrication oil.

Referring to FIG. 13, in second operational control, based on the temperature of the lubrication oil the torque gradient and continuation time are controlled. At step 126, based on the friction coefficient, the torque gradient can be set. At step 127, based on the friction coefficient, the continuation time can be set. For example, a map of the function of the reverse input torque and temperature of the lubrication oil can be stored in advance in the control device. Further, the set torque gradient and continuation time may be multiplied with a correction coefficient based on the friction coefficient.

In the second operational control, by considering the friction coefficient at the sliding parts inside of the clutch 70, the torque gradient and continuation time required for releasing the locked state of the clutch 70 can be accurately set. For this reason, it is possible to keep the required capacity of the rotating machine from becoming excessively large. Further, it is possible to decrease the consumed power when releasing the locked state of the clutch 70.

Next, third operational control of the present embodiment will be explained. In the third operational control, the state of the accumulator 92 when releasing the locked state of the clutch 70 is detected. Further, based on the state of the accumulator 92, the pattern of supply of power to the motor 59 is set.

Figure 19:
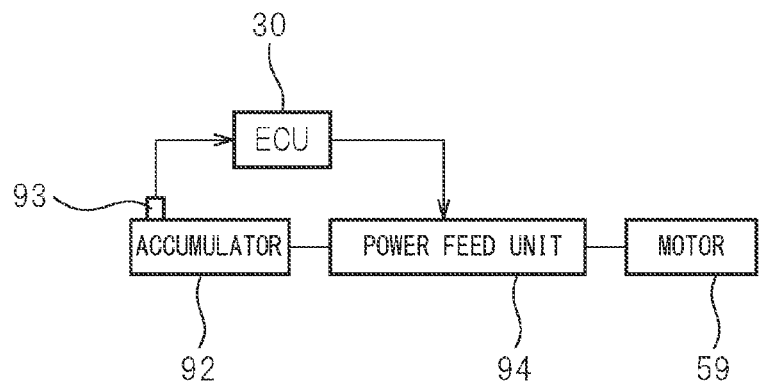
FIG. 19 is a schematic view of a power feed device supplying power to a motor of a variable compression ratio mechanism in an embodiment.

FIG. 19 is a schematic view of a power feed device for supplying power to the motor of the variable compression ratio mechanism. The internal combustion engine comprises an accumulator 92 for supplying power to the motor 59, a power feed unit 94, and a voltage detector 93 detecting the output voltage of the accumulator 92. The output of the voltage detector 93 is input to the electronic control unit 30. The power feed unit 94 supply power from the accumulator 92 to the motor 59 based on a command of the electronic control unit 30.

Referring to FIG. 12, in the above-mentioned operational control, the torque gradient and continuation time are set so that the torque gradient of the input shaft 71 of the clutch 70 becomes larger. In this control, it is possible to reduce the power consumption, but the load of the accumulator 92 becomes greater. Further, the voltage drop of the accumulator 92 when releasing the locked state of the clutch 70 becomes larger. If the voltage drop of the accumulator 92 becomes larger, problems are liable to occur in the control of the mechanical compression ratio after release of the locked state. Alternatively, problems are liable to occur in control of other devices connected to the accumulator 92.

In the third operational control, before releasing the locked state of the clutch 70, the output voltage of the accumulator 92 is detected and the voltage drop allowed at the time of the drop of the mechanical compression ratio is calculated. When the allowed voltage drop is a predetermined judgment value or more, control similar to the first operational control is performed. On the other hand, if the allowed voltage drop is less than the predetermined judgment value, based on the allowed voltage drop, the torque gradient and continuation time are set. The torque gradient is set lower than the maximum torque gradient which the motor 59 can output. Further, the continuation time is set longer than the minimum continuation time corresponding to the maximum torque gradient.

Figure 20:
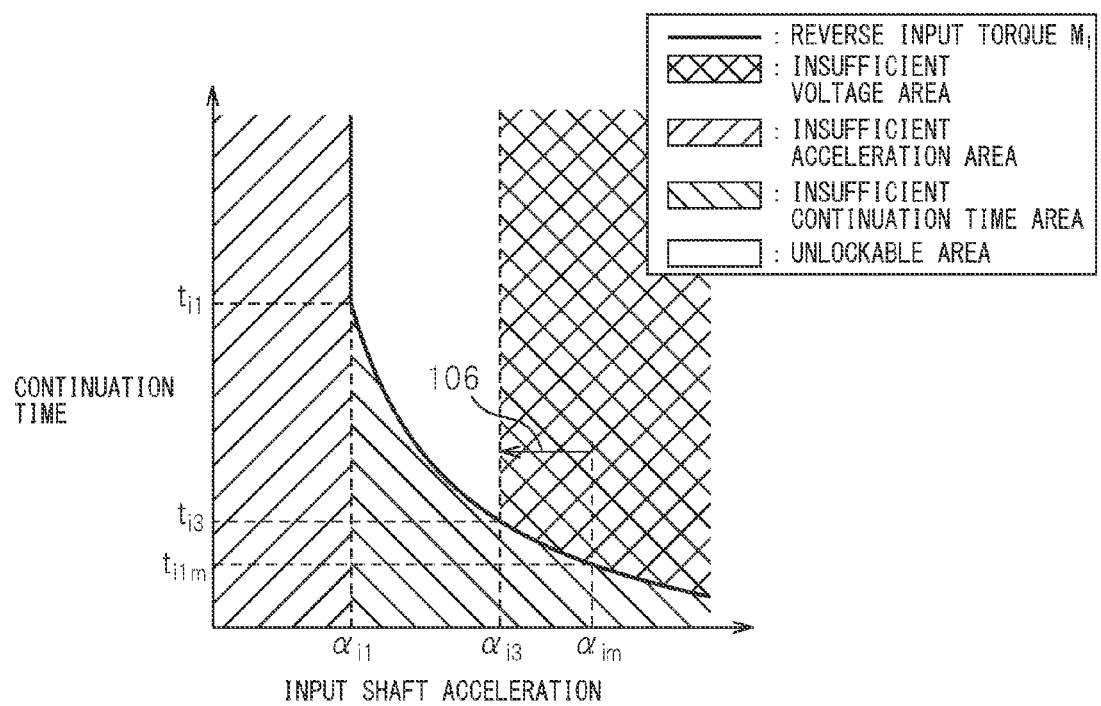
FIG. 20 is a graph explaining an area enabling release of a locked state with respect to acceleration of an input shaft and continuation time of continuation of increase of an input torque in a clutch of an embodiment.

FIG. 20 is a graph showing the area where the locked state of the clutch can be released with respect to the input shaft acceleration and continuation time. FIG. 20 is a graph at the time of the reverse input torque $M_1$. In this embodiment, if setting the acceleration $α_i$ of the input shaft to the maximum acceleration $α_{im}$ of the input shaft of the motor 59, the voltage drop becomes larger and the accumulator 92 ends up becoming less than a predetermined voltage judgment value. For this reason, based on the detected voltage of the accumulator 92, the allowed voltage drop is calculated. Further, based on the allowed voltage drop, the acceleration $α_{i3}$ of the input shaft is calculated. As shown by the arrow 103, the acceleration $α_{i3}$ of the input shaft is set lower than the maximum acceleration $α_{im}$ of the input shaft. Further, the continuation time $t_{i3}$ is set based on the acceleration $α_{i3}$ of the input shaft. The mechanical compression ratio is changed based on the set acceleration $α_{i3}$ of the input shaft and continuation time $t_{i3}$.

By performing the third operational control, when releasing the locked state of the clutch 70, it is possible to keep the output voltage of the accumulator from becoming less than a predetermined voltage and keep problems from occurring in the control of the mechanical compression ratio after releasing the locked state. Further, it is possible to suppress problems in the control of other devices.

Figure 21:
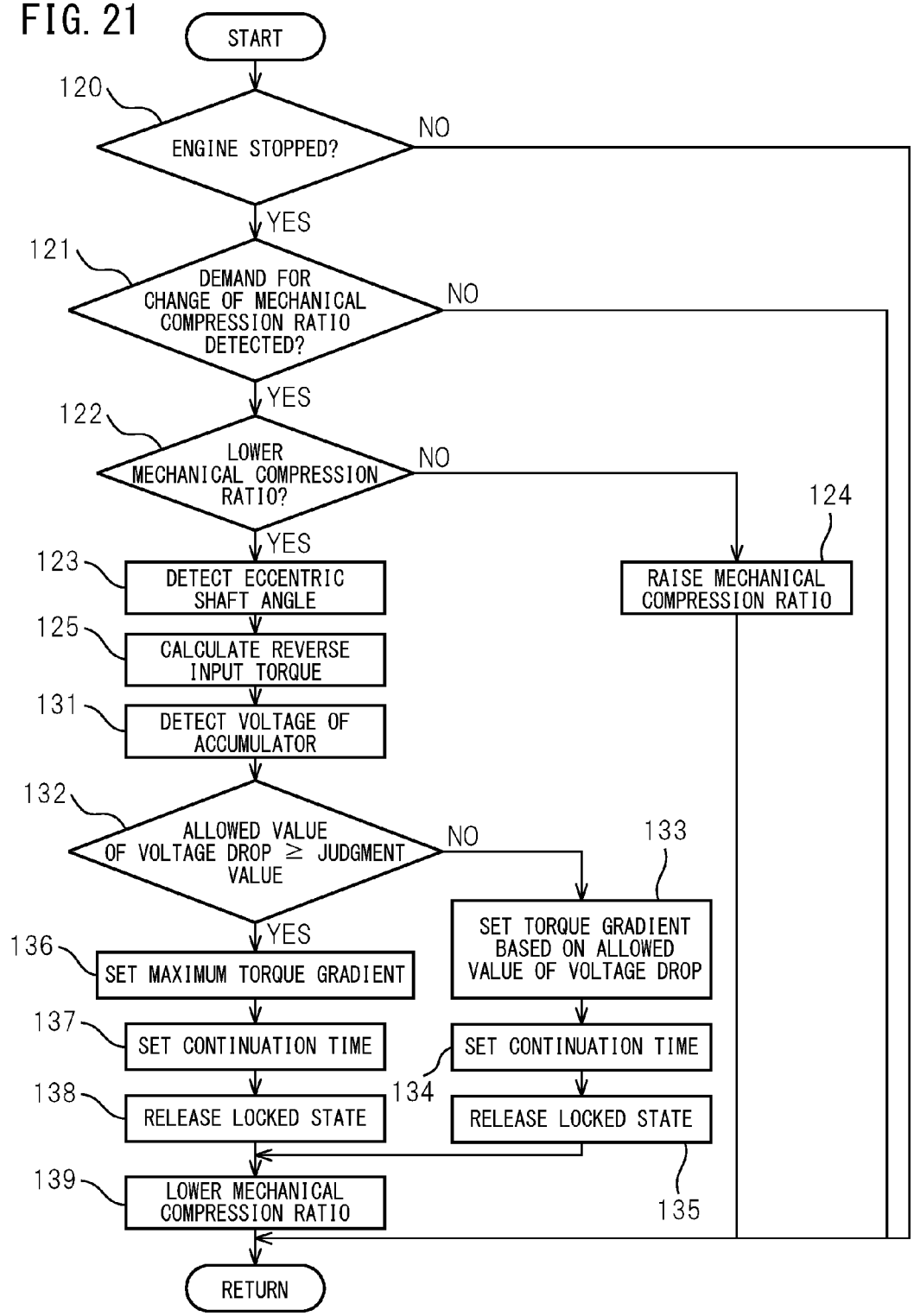
FIG. 21 is a flow chart of third operational control changing a mechanical compression ratio in an embodiment.

FIG. 21 shows a flow chart of the third operational control in the present embodiment. This operational control can, for example, be repeatedly performed every predetermined time interval. Step 120 to step 125 is similar to the first operational control shown in FIG. 13. At step 125, based on the eccentric shaft angle, the reverse input torque is calculated.

Next, at step 131, the voltage of the accumulator 92 is detected by the voltage detector 93. Further, based on the voltage of the accumulator 92, the voltage drop allowed in control for lowering the mechanical compression ratio, that is, the allowed value of voltage drop is set.

Next, at step 132, it is judged if the allowed value of the voltage drop is a predetermined judgment value or more. For example, the judgment value can be set in advance to the voltage drop when selecting the maximum torque gradient. If the allowed value of the voltage drop is the judgment value or more, it is possible to judge that the voltage which the accumulator 92 outputs is sufficiently high. In this case, the routine proceeds to step 136.

At step 136, the maximum torque gradient which the motor 59 can output is set. At step 137, the continuation time corresponding to the set torque gradient is set. At step 138, based on the set torque gradient and continuation time, the locked state is released. Next, at step 139, the mechanical compression ratio is lowered.

When at step 132 the allowed value of the voltage drop is less than the predetermined judgment value, the routine proceeds to step 133. In this case, it is judged that the voltage of the accumulator 92 is insufficient if lowering the mechanical compression ratio by the maximum torque gradient.

At step 133, the torque gradient is set based on the allowed value of the voltage drop. The value of the torque gradient having the allowed value of the voltage drop as a function can be stored in advance in the electronic control unit 30. In this way, based on the current output voltage of the accumulator 92, the torque gradient can be set. In the present embodiment, it is possible to set the duty ratio of the power supplied to the motor 59.

Next, at step 134, based on the set torque gradient the continuation time is set. At step 135, the set torque gradient and continuation time are used to release the locked state. Next, at step 139, the mechanical compression ratio is lowered.

In this way, in third operational control, it is possible to detect the drop in the output voltage of the accumulator 92 and perform control so as to prevent the output voltage of the accumulator 92 from becoming too low after the mechanical compression ratio falls.

In the above-mentioned operational control, control changing the mechanical compression ratio during the period where the engine 90 is stopped was illustrated, but the operational control of the present invention can also be applied during the operating period of the engine 90. Next, fourth operational control changing the mechanical compression ratio during the operating period of the engine 90 will be explained.

Figure 22:
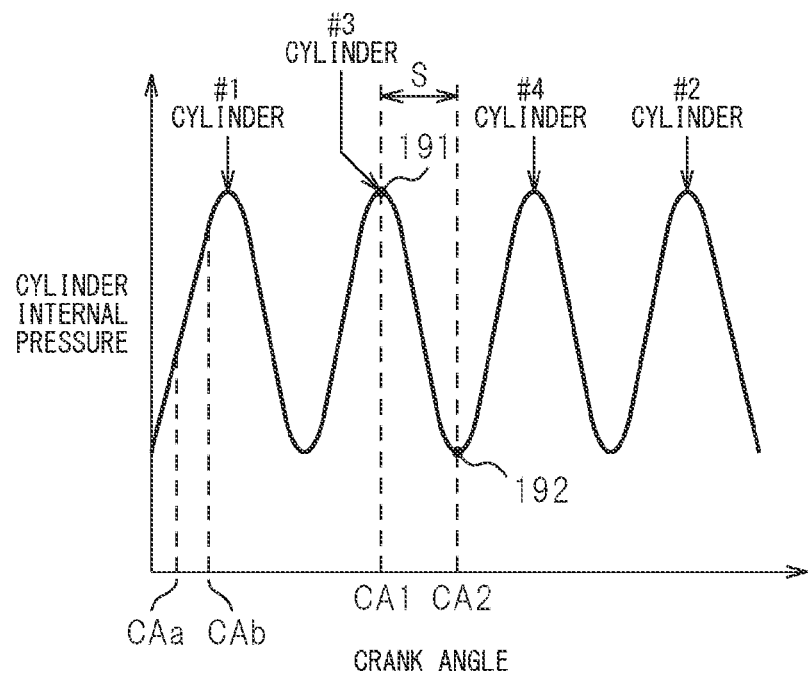
FIG. 22 is a graph of cylinder internal pressure with respect to a crank angle of an internal combustion engine in an embodiment.

FIG. 22 is a graph explaining the relationship between the crank angle at the internal combustion engine of the present embodiment and the cylinder internal pressure. The internal combustion engine in the present embodiment has a plurality of cylinders. In the present embodiment, four cylinders are formed. Each of these cylinders is supplied with an air-fuel mixture of fuel and air. By igniting this, the fuel burns and the cylinder internal pressure rises. The cylinder internal pressure can be detected by the cylinder internal pressure sensor 23 (see FIG. 1). FIG. 22 describes the cylinder internal pressure of each of the #1 cylinder, #3 cylinder, #4 cylinder, and #2 cylinder in accordance with the order of ignition. The crank angle of the abscissa corresponds to the time. The cylinder internal pressure of the ordinate corresponds to the force acting on the cylinder block 2 through the cylinder head 3. In the cylinder internal pressure, due to burning of the fuel, a local maximum point 191 where the cylinder internal pressure becomes the maximum and a local minimum point 192 where the cylinder internal pressure becomes the minimum appear.

Referring to FIG. 10, during the operating period, the cylinder internal pressure and the biasing force of the lift springs 65 cause each output shaft 74 to receive a reverse input torque in the direction shown by the arrow 100. If raising the mechanical compression ratio, it is possible to easily make the rollers 80*b* separate from the engagement parts 86*b* to push against the rollers 80*b* at the engagement parts 86*b* at the side not blocking reverse input torque. That is, it is possible to easily unlock the locked state.

Referring to FIG. 8 and FIG. 9, when lowering the mechanical compression ratio, input shaft 71 rotates in the direction shown by the arrow 101. The rotational direction of the input shaft 71 becomes the same as the rotational direction of the rotational force applied to the output shaft 74 shown by the arrow 100. The reverse input torque applied to the output shaft 74 depends on the cylinder internal pressure. If the cylinder internal pressure becomes larger, the reverse input torque applied to the output shaft 74 also becomes larger. For this reason, the reverse input torque also repeatedly increases and decreases. The period of the vibration of the reverse input torque applied to the output shaft 74 becomes similar to the period of the vibration of the cylinder internal pressure.

Referring to FIG. 22, for example, from the crank angle CAa toward the crank angle CAb, the cylinder internal pressure rises. The reverse input torque applied to the output shaft 74 also increases. When the cylinder internal pressure rises, the amounts by which the rollers 80*a* are caught in the engagement parts 86*a* increase. At this time, to make the mechanical compression ratio fall, even if trying to push against the rollers 80*a* by the holding parts 73 and unlock the locked state of the rollers 80*a*, a large force becomes necessary.

On the other hand, if the cylinder internal pressure falls, the reverse input torque applied to the output shaft 74 decreases. The amounts of the rollers 80*a* caught in the engagement parts 86*a* become smaller. The rollers 80*a* move relatively in a direction away from the engagement parts 86*a*. At this time, if the holding parts 73 are used to push against the rollers 80*a*, the separation of the rollers 80*a* from the engagement parts 86*a* can be promoted and a small force can be used to release the engagement of the rollers 80*a*.

For example, in the period S from the crank angle CA1 (local maximum point 191 of cylinder internal pressure) to the crank angle CA2 (local minimum point 192 of cylinder internal pressure), the cylinder internal pressure decreases. By starting the pushing action of the rollers 80*a* in the period S to lower the mechanical compression ratio, a small force can be used to release the engagement of the rollers 80*a*. In the present embodiment, the operation of the motor 59 of the drive device is started at the local maximum point 191 of the cylinder internal pressure.

Here, if the period S elapses, the cylinder internal pressure again rises. For this reason, the rollers 80*a* preferably finish being detached from the engagement parts 86*a* within the period S. That is, the rollers 80*a* are preferably detached from the engagement parts 86*a* within the period of the period S. The control device of the present embodiment controls the motor 59 so that the rollers 80*a* separate from the engagement parts 86*a* before the period S of transition of the cylinder internal pressure from the local maximum point 191 to the local minimum point 192 ends.

By releasing the locked state of the clutch 70 in the period of transition of the cylinder internal pressure from the local maximum point 191 to the local minimum point 192, it is possible to release the locked state of the clutch 70 by a small drive force. If lowering the mechanical compression ratio, it is possible to release the locked state of the clutch 70 even without performing the above-mentioned operational control setting the torque gradient and continuation time.

However, if continuing to use the internal combustion engine, due to the abnormality of the variable compression ratio mechanism, aging of the parts forming the eccentric shaft, etc., sometimes the fluctuation of the cylinder internal pressure is not sufficiently transmitted to the output shaft 74 of the clutch 70. For example, due to wear of the bearings of the eccentric shafts, a drop in the efficiency of power transmission of the worm gears due to looseness, etc., sometimes fluctuation of the rotational force due to cylinder internal pressure is not sufficiently transmitted to the output shaft 74 of the clutch 70. Alternatively, due to deterioration of the lubrication oil lubricating the mechanism of the eccentric shafts, sometimes fluctuation of the cylinder internal pressure is not sufficiently transmitted to the output shaft 74. As a result, sometimes the amplitude of the vibration of the reverse input torque applied to the output shaft 74 of the clutch 70 becomes smaller.

Figure 23:
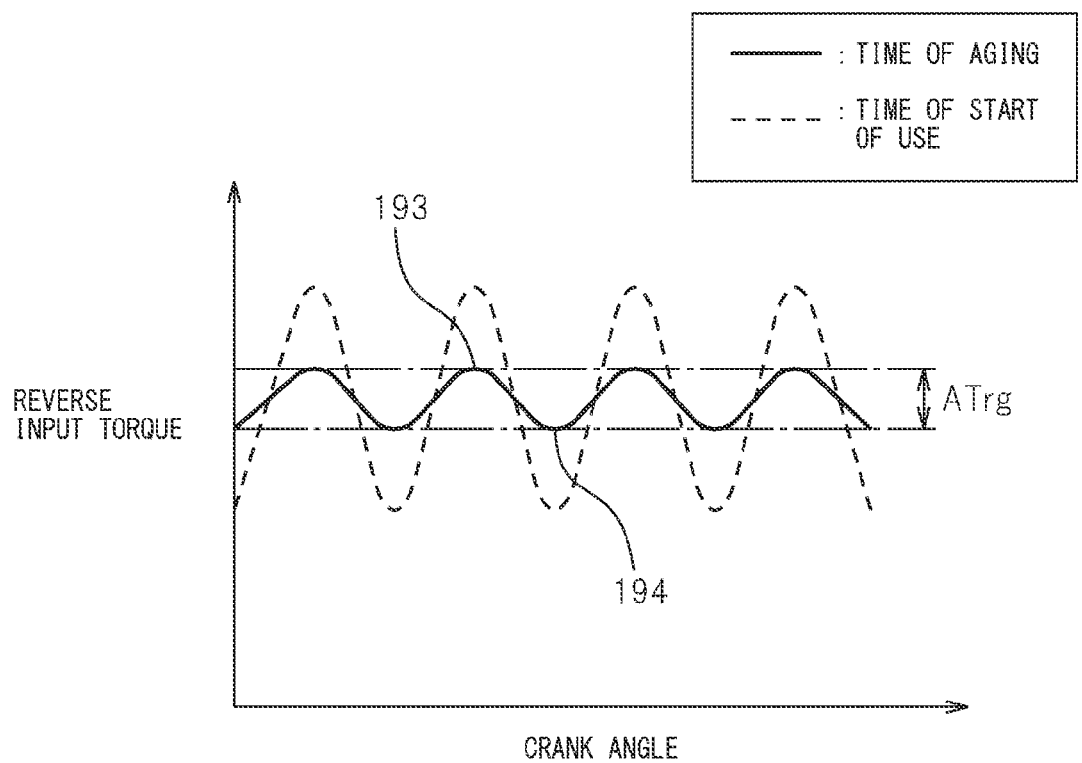
FIG. 23 is a graph of reverse input torque of a clutch with respect to a crank angle of an internal combustion engine in an embodiment.

FIG. 23 is a graph showing the relationship between the crank angle and the reverse input torque applied to the output shaft of the clutch. FIG. 23 shows a graph at the time of start of use of the variable compression ratio mechanism and a graph of the time of aging. At the time of start of use of the variable compression ratio mechanism, for example, at the time of a new product, there is no aging, so the amplitude of the reverse input torque becomes larger. As opposed to this, when aging or when the variable compression ratio mechanism is abnormal, the amplitude of the reverse input torque decreases and becomes smaller.

When performing control for releasing the locked state of the clutch 70 in the period of transition of the cylinder internal pressure from the local maximum point 193 to the local minimum point 194, if the amplitude of the vibration of the reverse input torque becomes smaller, it sometimes becomes difficult to release the locked state of the clutch 70. In particular, if lowering the mechanical compression ratio, sometimes it becomes difficult to release the locked state of the clutch 70.

Therefore, the internal combustion engine of the present embodiment performs similar control to the first operational control to third operational control of the present embodiment when the amplitude of vibration of the reverse input torque applied to the output shaft 74 becomes smaller than a predetermined judgment value. That is, when lowering the mechanical compression ratio, the torque gradient and continuation time are set to control the motor 59. Here, an example of performing the first operational control will be taken up for the explanation.

FIG. 24 shows a flow chart of fourth operational control in the present embodiment. This operational control, for example, can be repeatedly performed every predetermined time interval.

At step 150, it is judged if the engine 90 is in the middle of an operating period. For example, it is judged if the engine speed is larger than zero. When the engine 90 has stopped, this control is ended. When the engine 90 is in the middle of an operating period, the routine proceeds to step 121.

Step 121, step 122, and step 124 are similar to the first operational control (see FIG. 13). When lowering the mechanical compression ratio at step 122, the routine proceeds to step 151.

At step 151, the amplitude of the vibration of the reverse input torque is estimated. Here, control for estimation of the amplitude of vibration of the reverse input torque will be explained. The internal combustion engine of the present embodiment includes a rotational force estimating device for estimating the reverse input torque applied to the output shaft 74 of the clutch 70 during the operating period. Referring to FIG. 2, the rotational force estimating device of the present embodiment includes a torque detector 89 detecting the reverse input torque of the output shaft 74 of the clutch 70.

The torque detector 89 of the present embodiment is a strain gauge type. The torque detector 89 can detect torsion of the output shaft 74 and use the detected torsion to detect the reverse input torque applied to the output shaft 74. The rotational force estimating device is not limited to this. Any device measuring the reverse input torque applied to the output shaft 74 can be employed. For example, as a rotational force estimating device, a magnetostriction type torque sensor may be employed.

Referring to FIG. 23, the internal combustion engine of the present embodiment detects the amount of torsion of the output shaft 74 detected by the rotational force estimating device and based on the detected amount of torsion, the reverse input torque of the local maximum point 193 and the reverse input torque of the local minimum point 194 are estimated. Further, based on the local maximum value and local minimum value of the reverse input torque, the amplitude ATrg of vibration of the reverse input torque is calculated. In calculating the amplitude ATrg, based on a single local maximum point 193 and a single local minimum point 194 a single amplitude ATrg can be calculated. Alternatively, based on a plurality of local maximum points 193 and a plurality of local minimum points 194, an average value of a plurality of amplitudes etc., can be employed.

Referring to FIG. 24, next, at step 152, it is judged if the amplitude ATrg of vibration of the reverse input torque is a predetermined judgment value of the amplitude or more. If the amplitude ATrg of the reverse input torque is the predetermined judgment value of the amplitude or more, it can be judged that the amplitude of vibration of the reverse input torque for lowering the mechanical compression ratio is sufficiently large. In this case, the routine proceeds to step 153.

At step 153, unlocking control during the period of normal operation explained above can be used to release the locked state. For example, referring to FIG. 22, the locked state is released during the period of the period S. Further, at step 129, the mechanical compression ratio can be lowered to the target mechanical compression ratio.

When at step 152 the amplitude ATrg of the reverse input torque is less than the predetermined judgment value of the amplitude, it is judged that the amplitude of vibration of the reverse input torque is insufficient for lowering the mechanical compression ratio. In this case, the routine proceeds to step 125.

Step 125 to step 128 are similar to the first operational control of the present embodiment. That is, the torque gradient and continuation time of continuation of the increase of the torque are calculated and based on the calculated torque gradient and continuation time, the locked state of the clutch is released.

Here, in the calculation of the reverse input torque at step 125, the reverse input torque due to the cylinder internal pressure is considered. For example, the amount of torsion of the output shaft 74 detected by the torque detector 89 is calculated and based on the calculated amount of torsion, the reverse input torque of the local maximum point 193 and the reverse input torque of the local minimum point 194 are estimated. Further, the average value of the reverse input torque of the local maximum point 193 and the reverse input torque of the local minimum point 194 can be made the reverse input torque applied to the output shaft. Alternatively, based on the output value of the cylinder internal pressure sensor and the angle of the eccentric shaft, the reverse input torque may be estimated.

Further, after releasing the locked state at step 128, it is possible to lower the mechanical compression ratio to the target mechanical compression ratio at step 129.

In the fourth operational control of the present embodiment, the local maximum value and local minimum value of the reverse input torque are estimated to calculate the amplitude of vibration of the reverse input torque, but the invention is not limited to this. It is possible to perform any control enabling judgment of whether the amplitude of vibration of the reverse input torque is less than the judgment value. For example, it is possible to detect the maximum value (local maximum value) of the reverse input torque in a predetermined operating state of the internal combustion engine and, when the detected maximum value of the reverse input torque is smaller than a predetermined judgment value of the maximum value, judge that the amplitude of vibration of the reverse input torque is less than the predetermined judgment value of the amplitude.

In the fourth operational control as well, the third operational control can be incorporated. That is, when it is judged that the voltage of the accumulator would become less than the allowed value if releasing the locked state by the maximum torque gradient during the operating period, it is possible to set the pattern of power supplied to the rotating machine based on the allowed value of the voltage drop of the accumulator.

The clutch in the present embodiment is formed so as to transmit to the output shaft the rotational force from the input shaft in the two directions of the rotational direction where the mechanical compression ratio rises and the rotational direction where the mechanical compression ratio falls and to block the rotational force in the two directions from the output shaft. The clutch is not limited to this. It is sufficient that it is formed so as to transmit to the output side the rotational force of the two directions from the input shaft and to block the rotational force from the output shaft in the rotational direction where the mechanical compression ratio falls.

Furthermore, the variable compression ratio mechanism of the present embodiment includes shafts interposed between the support structure and cylinder block and including eccentric shafts and changes the relative position of the cylinder block with respect to the support structure, but the invention is not limited to this. The present invention can be applied to a variable compression ration mechanism including eccentric shafts for changing the volumes of combustion chambers at the time when the pistons reach top dead center and a drive device for driving rotation of the eccentric shafts.

In the present embodiment, an internal combustion engine mounted in a vehicle was illustrated for the explanation, but the invention is not limited to this. The present invention can be applied to an internal combustion engine arranged in any device or facility etc.

The above embodiments can be combined. In the above figures, the same or equivalent parts are assigned the same reference notations. Further, in the above control routines, the orders of the steps can be suitably changed within a range not changing the functions and actions. Note that, the above embodiments are illustrative and do not limit the invention. Further, the embodiments include changes in mode shown in the claim section.

REFERENCE SIGNS LIST 1. crankcase
2. cylinder block
5. combustion chamber
22. relative position sensor
23. cylinder internal pressure sensor
30. electronic control unit
54, 55. camshaft
56, 58. circular cam
57. eccentric shaft
59. motor
65. lift spring
70. clutch
71. input shaft
74. output shaft
77. outer race
80a, 80b roller
89. torque detector
90. engine
92. accumulator
93. voltage detector
A. variable compression ratio mechanism

The invention claimed is:

1. An internal combustion engine comprising a variable compression ratio mechanism able to change a mechanical compression ratio, wherein
    the variable compression ratio mechanism includes a drive device for changing a volume of a combustion chamber when a piston reaches top dead center and a control device controlling the drive device,
    the drive device includes a rotating machine and a clutch arranged in a drive force transmission path transmitting the rotational force of the rotating machine,
    the clutch is formed so as to block a reverse input torque applied to an output shaft in a rotation direction causing the mechanical compression ratio to fall, and
    the control device estimates a reverse input torque applied to the output shaft of the clutch, sets a torque gradient to be output by the rotating machine and a continuation time for continuation of increase of torque based on the reverse input torque, and releases a locked state of the clutch based on the torque gradient and the continuation time.

2. The internal combustion engine according to claim 1 wherein
    the clutch includes an input shaft to which a rotational force of the rotating machine is input, an output shaft to which the rotational force is transmitted from the input shaft, and an outer race not moving while the clutch is being driven, rollers are arranged between the output shaft and the outer race, the output shaft and the outer race form engagement parts for engaging with the rollers, and the clutch is formed so that when the reverse input torque in the rotation direction causing the mechanical compression ratio to fall acts on the output shaft, the rollers are engaged with the engagement parts and lock the output shaft with the outer race thereby blocking the reverse input torque, and
    the control device makes the input shaft rotate based on the torque gradient and the continuation time to thereby separate the rollers from the engagement parts and release the lock on the output shaft.

3. The internal combustion engine according to claim 1 wherein
    the rotating machine includes an electric motor, and
    the control device changes a duty ratio of current supplied to the electric motor to thereby control the torque gradient and changes a time period for supplying power to the electric motor to thereby control the continuation time.

4. The internal combustion engine according to claim 1 wherein
    the variable compression ratio mechanism includes a lubrication oil supplying device supplying lubrication oil to the clutch and a temperature detector detecting a temperature of the lubrication oil, and
    the control device detects a temperature of the lubrication oil and controls the torque gradient and the continuation time based on the temperature of the lubrication oil.

5. The internal combustion engine according to claim 3 wherein the engine comprises
    an accumulator supplying power to the electric motor and a voltage detector detecting an output voltage of the accumulator, and
    the control device sets the torque gradient and the continuation time based on a voltage drop allowed for releasing the locked state when detecting an output voltage of the accumulator and the output voltage is lower than a predetermined voltage judgment value.

6. The internal combustion engine according to claim 1 wherein the engine comprises
a support structure including a crankcase and
a cylinder block supported by the support structure,
the variable compression ratio mechanism includes shafts interposed between the support structure and cylinder block and including eccentric shafts, and the drive device changes a size of the combustion chamber by making the shafts rotate to change a relative position of the cylinder block with respect to the support structure.

7. The internal combustion engine according to claim 6 wherein the engine comprises a biasing member biasing the cylinder block in a direction separating from the support structure, and
the control device sets the torque gradient and the continuation time based on a biasing force of the biasing member when lowering the mechanical compression ratio in a period during which fuel stops being burned in the combustion chamber.

8. The internal combustion engine according to claim 6 wherein the engine comprises
a cylinder internal pressure detector detecting a cylinder internal pressure and
a rotational force estimating device estimating a reverse input torque applied to the output shaft of the clutch, and
the control device detects the cylinder internal pressure when lowering the mechanical compression ratio during the operating period of the internal combustion engine, controls the rotating machine so as to start driving the input shaft of the clutch during the period when the cylinder internal pressure is changing from a local maximum point to a local minimum point, estimates the reverse input torque when an amplitude of vibration of a reverse input torque applied to the output shaft of the clutch is less than a predetermined judgment value, and sets the torque gradient and the continuation time based on the reverse input torque.

* * * * *